(12) United States Patent
Müller et al.

(10) Patent No.: US 7,555,891 B2
(45) Date of Patent: Jul. 7, 2009

(54) WAVE ROTOR APPARATUS

(75) Inventors: Norbert Müller, Haslett, MI (US); Pezhman Akbari, Indianapolis, IN (US); Janusz Piechna, Warsaw (PL); Florin Iancu, York, PA (US)

(73) Assignee: Board of Trustees of Michigan State University, East Lansing, MI (US)

( * ) Notice: Subject to any disclaimer, the term of this patent is extended or adjusted under 35 U.S.C. 154(b) by 531 days.

(21) Appl. No.: 11/271,483

(22) Filed: Nov. 11, 2005

(65) Prior Publication Data

US 2006/0130478 A1   Jun. 22, 2006

Related U.S. Application Data

(60) Provisional application No. 60/627,742, filed on Nov. 12, 2004.

(51) Int. Cl.
*F02C 3/02* (2006.01)

(52) U.S. Cl. ...................................................... 60/39.45

(58) Field of Classification Search ................. 60/39.45, 60/772, 726; 417/64
See application file for complete search history.

(56) References Cited

U.S. PATENT DOCUMENTS

| | | |
|---|---|---|
| 3,726,619 A | 4/1973 | Adams |
| 3,756,310 A | 9/1973 | Becker |
| 3,797,559 A | 3/1974 | Paul et al. |
| 3,828,573 A | 8/1974 | Eskeli |
| 3,869,808 A | 3/1975 | Sawyer |
| 3,952,798 A | 4/1976 | Jacobson et al. |
| 4,002,414 A | 1/1977 | Coleman, Jr. et al. |
| 4,005,587 A | 2/1977 | Eskeli |
| 4,044,824 A | 8/1977 | Eskeli |
| 4,171,623 A | 10/1979 | Lavigne, Jr. et al. |
| 4,182,402 A | 1/1980 | Adrian |
| 4,582,128 A | 4/1986 | Jarreby |
| 4,597,835 A | 7/1986 | Moss |
| 4,627,890 A | 12/1986 | Porter et al. |
| 4,719,746 A | 1/1988 | Keller |
| 5,052,898 A | 10/1991 | Cook |
| 5,116,205 A | 5/1992 | Kirchhofer .................... 417/64 |
| 5,119,886 A | 6/1992 | Fletcher et al. |

(Continued)

OTHER PUBLICATIONS

A. Kharazi et al., "Preliminary Study of a Novel R718 Turbo-Compressoin Cycle Using a 3-Port Condensing Wave Rotor", GT2004-53622, Proceedings of ASME Turbo Expo Power for Land, Sea, and Air, Jun. 2004 pp. 1-7.

(Continued)

*Primary Examiner*—Michael Cuff
*Assistant Examiner*—Andrew Nguyen
(74) *Attorney, Agent, or Firm*—Harness, Dickey & Pierce, P.L.C.

(57) ABSTRACT

A wave rotor apparatus is provided. In another aspect of the present invention, a radial wave rotor includes fluid passageways oriented in a direction offset from its rotational axis. A further aspect of the present invention employs stacked layers of generally radial channels in a wave rotor. Moreover, turbomachinery is located internal to a wave rotor in yet another aspect of the present invention. In yet another aspect of the present invention, a radial wave rotor has an igniter and fuel injector. Correctional passages are employed in still another aspect of the present invention wave rotor.

65 Claims, 26 Drawing Sheets

U.S. PATENT DOCUMENTS

| | | | |
|---|---|---|---|
| 5,154,580 | A | 10/1992 | Hora |
| 5,267,432 | A | 12/1993 | Paxson |
| 5,274,994 | A * | 1/1994 | Chyou et al. ............... 60/39.45 |
| 5,297,384 | A | 3/1994 | Paxson |
| 5,445,216 | A | 8/1995 | Cannata |
| 5,490,760 | A | 2/1996 | Kotzur |
| 5,503,222 | A | 4/1996 | Dunne |
| 5,520,008 | A | 5/1996 | Ophir et al. |
| 5,639,208 | A | 6/1997 | Theis |
| 5,647,221 | A | 7/1997 | Garris, Jr. |
| 5,894,719 | A | 4/1999 | Nalim et al. |
| 5,904,470 | A | 5/1999 | Kerrebrock et al. |
| 5,916,125 | A | 6/1999 | Snyder |
| 5,931,640 | A | 8/1999 | Van Houten et al. |
| 5,932,940 | A | 8/1999 | Epstein et al. |
| 6,065,297 | A | 5/2000 | Tischer et al. |
| 6,134,109 | A | 10/2000 | Muller et al. |
| 6,138,456 | A | 10/2000 | Garris |
| 6,185,956 | B1 | 2/2001 | Brasz |
| 6,196,809 | B1 | 3/2001 | Takahashi et al. |
| RE37,134 | E | 4/2001 | Wilson |
| 6,238,524 | B1 | 5/2001 | Zebuhr |
| 6,253,833 | B1 | 7/2001 | Köster et al. |
| 6,261,419 | B1 | 7/2001 | Zebuhr |
| 6,328,094 | B1 | 12/2001 | Mori et al. |
| 6,351,934 | B2 | 3/2002 | Snyder |
| 6,381,948 | B1 | 5/2002 | Klingels |
| 6,388,346 | B1 | 5/2002 | Lopatinsky et al. |
| 6,392,313 | B1 | 5/2002 | Epstein et al. |
| 6,393,208 | B1 | 5/2002 | Nosenchuck |
| 6,427,464 | B1 | 8/2002 | Beaverson et al. |
| 6,449,939 | B1 | 9/2002 | Snyder |
| 6,460,342 | B1 | 10/2002 | Nalim |
| 6,505,462 | B2 * | 1/2003 | Meholic .................... 60/39.39 |
| 6,526,936 | B2 | 3/2003 | Nalim |
| 6,584,764 | B2 | 7/2003 | Baker |
| 6,606,854 | B1 | 8/2003 | Siefker et al. |
| 2001/0052228 | A1* | 12/2001 | Rakhmailov ............... 60/39.02 |
| 2002/0038555 | A1 | 4/2002 | Zebuhr |
| 2002/0071979 | A1 | 6/2002 | DuBose et al. |
| 2003/0079713 | A1 | 5/2003 | Nalim |
| 2005/0193713 | A1* | 9/2005 | Kovasity et al. ............ 60/39.08 |

OTHER PUBLICATIONS

G. Welch, "Overview of Wave-Rotor Technology for Gas Turbine Engne Topping Cycles", U.S. Army Research Laboratory (Lewis field), (believed to have been published before Nov. 12, 2004), pp. 1-17.

J. Kentfield, "Wave-Rotors and Highlights of their Development", AIAA98-3248, 34th AIAA/ASME/SAE/ASEE Joint Propulsion Conference and Exhibit, Jul. 1998, pp. 1-9.

J. Piechna et al., "Radial-Flow Wave Rotor Concepts, Unconventional Designs and Applications", DRAFT IMECE2004-59022, Proceedings of IMECE04 2004 ASME International Mechanical Engineering Congress, Nov. 2004, pp. 1-10.

M. Frackowiak et al., "Numerical Simulation of Unsteady-Flow Processes in Wave Rotors", DRAFT IMECE2003-60973, Proceedings of IMECE04 2004 ASME International Mechanical Engineering Congress, Nov. 2004, pp. 1-16.

N. Mëller, "Design of Compressor Impellers for Water as a Refrigerant", ASHRAE Transaction, vol. 107 at 214-222 (2001).

N. Müller, "Ein schneller Algorithmus für Entwurf und Berechnung von Laufrädern mit Radialfaserschaufeln", Klingenberg J., Heller W.: Beiträge Zur Strömungs-Mechanik, TU Dresden at 235-244 (2001).

P. Akbari et al., "Performance Investigation of Small Gas Turbine Engines Topped with Wave Rotors", AIAA 2003-4414, 39th AIAA/ASME/SAE/ASEE Joint Propulsion Conference and Exhibit, Jul. 2003, pp. 1-11.

P. Akbari et al., "A Review of Wave Rotor Technology and Its Applications", IMECE2004-60082, Proceedings of IMECE04 2004 ASME International Mechanical Engineering Congress, Nov. 2004, pp. 1-23.

P. Akbari et al., "Gas Dynamic Design Analyses of Charging Zone for Reverse-Flow Pressure Wave Superchargers", Proceedings of ICES03 2003 Spring Technical Conference of the ASME Internal Combustion Engine Division, May 2003, (ASME 2002), ICES2003-690, pp. 1-11.

P. Akbari et al., "Performance Improvement of Recuperated and Unrecuperated Microturbines Using Wave Rotor Machines", Paper No. 218, CIMAC Contress 2004, Kyoto, pp. 1-13.

P. Akbari et al., "Performance Improvement of Small Gas Turbines through Use of Wave Rotor Topping Cycles", GT2003-38772, Proceedings of ASME Turbo Expo Power for Land, Sea, and Air, Jun. 2003, (ASME 2002), pp. 1-7 2002, pp. 1-11.

P. Akbari et al., "Preliminary Design Procedure for Gas Turbine Topping Reverse-Flow Wave Rotors", GTSJ, IGTC2003Tokyo FR-301, Proceedings of the International Gas Turbine Congress, Nov. 2003, pp. 1-8.

P. Akbari et al., "Utilizing Wave Rotor Technology to Enhance the Turbo Compression in Power and Refrigeration Cycles", IMECE2003-44222, Proceedings of IMECE'03 2003 ASME International Mechanical Engineering Congress and Exposition, Nov. 2003, pp. 1-9.

A. Mehra et al., "A Six-Wafer Combustion System for a Silicon Micro Gas Turbine Engine", Journal of Microelectromechanical Systems, vol. 9, No. 4, Dec. 2000, pp. 517-527.

M. Schmidt, "Portable MEMS Power Sources", 2003 IEEE International Solid-State Circuits Conference, Session 22, TD: Embedded Technologies, Paper 22.5, 8 pages.

S. Ashley, "Turbines on a Dime", XP-000727170, Mechanical Engineering ASME, vol. 119, No. 10, Oct. 1997, pp. 78-81.

F. Iancu et al., "Feasibility Study of Integrating Four-Port Wave Rotors into Ultra-Mirco Gas Turbines (UμGT)", XP-002391768, 40th AIAA/ASME/SAE/ASEE Joint Propulsoin Conference and Exhibit, Jul. 2004, pp. 1-12.

J. Wilson et al., "Wave Rotor Optimization for Gas Turbine Engine Topping Cycles", Journal of Propulsion and Power, vol. 12, No. 4, Jul.-Aug. 1996, pp. 778-785.

Y. Oguri et al., "Research on Adaptation of Pressure Wave Supercharger (PWS) to Gasoline Engine", 2001-01-0368, SAE Technical Paper Series, SAE 2001 World Congress, Mar. 5-8, 2001, pp. 1-7.

H. Heisler, "Advanced Engine Technology", SAE International, 1997, pp. 356-363.

B. Berlinger, "New Pressure Wave Supercharger Improves Engine Performance, Reduces Emissions", Caterpillar, Tech of the Week (believed to have been published or publically used prior to Nov. 12, 2004), 2 pages.

M. Nalim, "Longitudinally Stratified Combustion in Wave Rotors", Journal of Propulsion and Power, vol. 15, No. 6, Nov.-Dec. 2000, pp. 1060-1068.

R. Nalim et al., "Two-Dimensional Flow and NOx Emissions in Deflagrative Internal Combustion Wave Rotor Configurations", GT-2002-30085, Proceedings of ASME International Turbine Institute ASME Turbo Expo, Jun. 2002, pp. 1-11.

J. Wilson, "Design of the NASA Lewis 4-Port Wave Rotor Experiment", Nasa Contractor Report 202351, Contract No. NAS3-27186, AIAA-97-3139, Jun. 1997, pp. 1-6.

P. Azoury, "Engineering Applications of Unsteady Fluid Flow", John Wiley & Sons, 1992, pp. 1-31, 109-144 (including contents, pp. vii-ix; foreward, pp. xi-xii; preface, pp. xiii-xvii).

Photograph of Comprex Axial Wave Rotor in Mazda Diesel Engine (publicly used in or before 1987); 1 page.

Capstone C60 Natural Gas (Micro Turbine)—Product Datasheet, Capstone Turbine Corp. (2003); 2 pages.

Livermore, Carol; "Here Come The Microengines;" The Industrial Physicist, (Dec. 2001/Jan. 2002); 4 pages.

"Mini Generator Has Enough Power To Run Electronics;" Georgia Institute of Technology (Nov. 24, 2004); 2 pages.

* cited by examiner

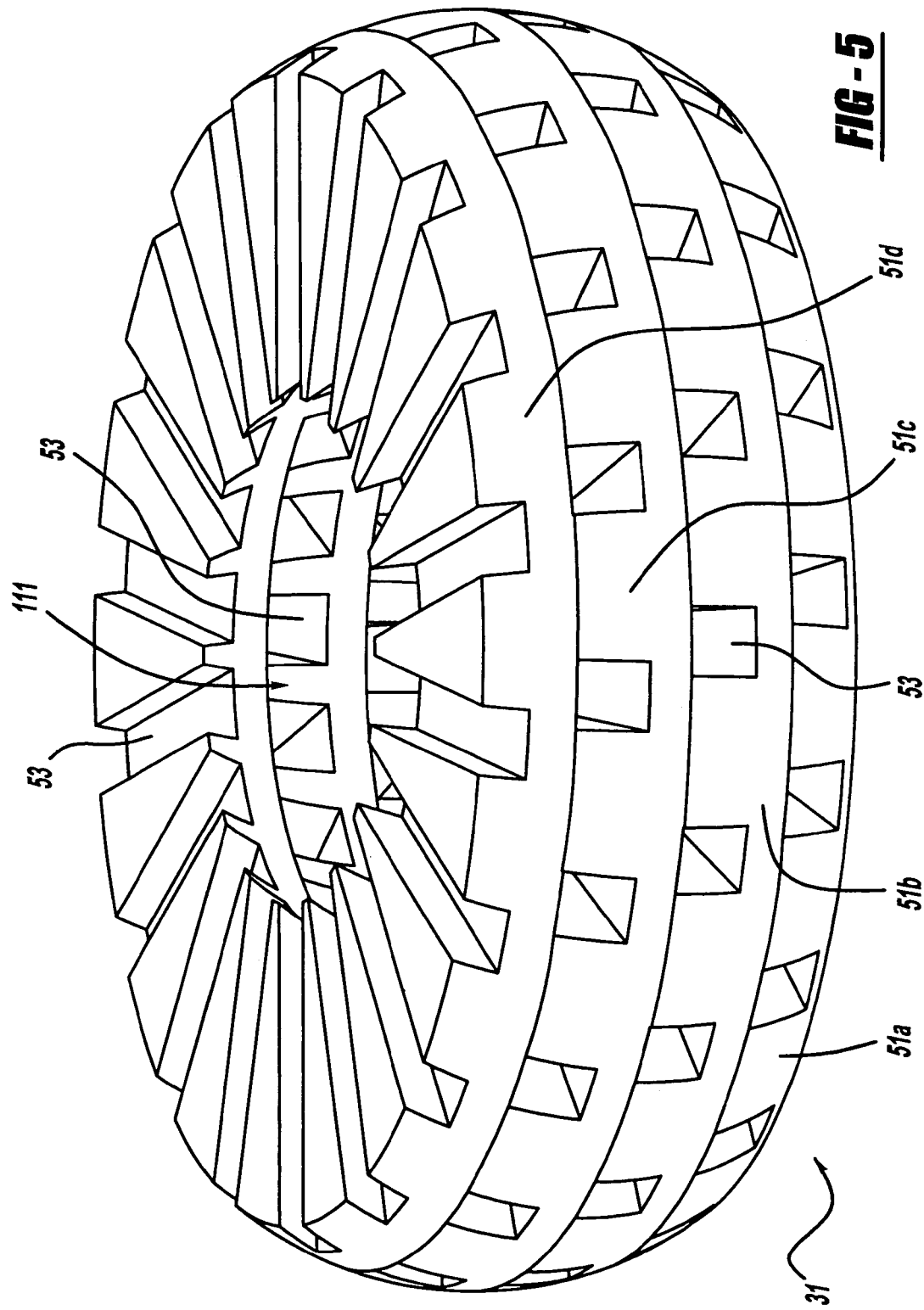

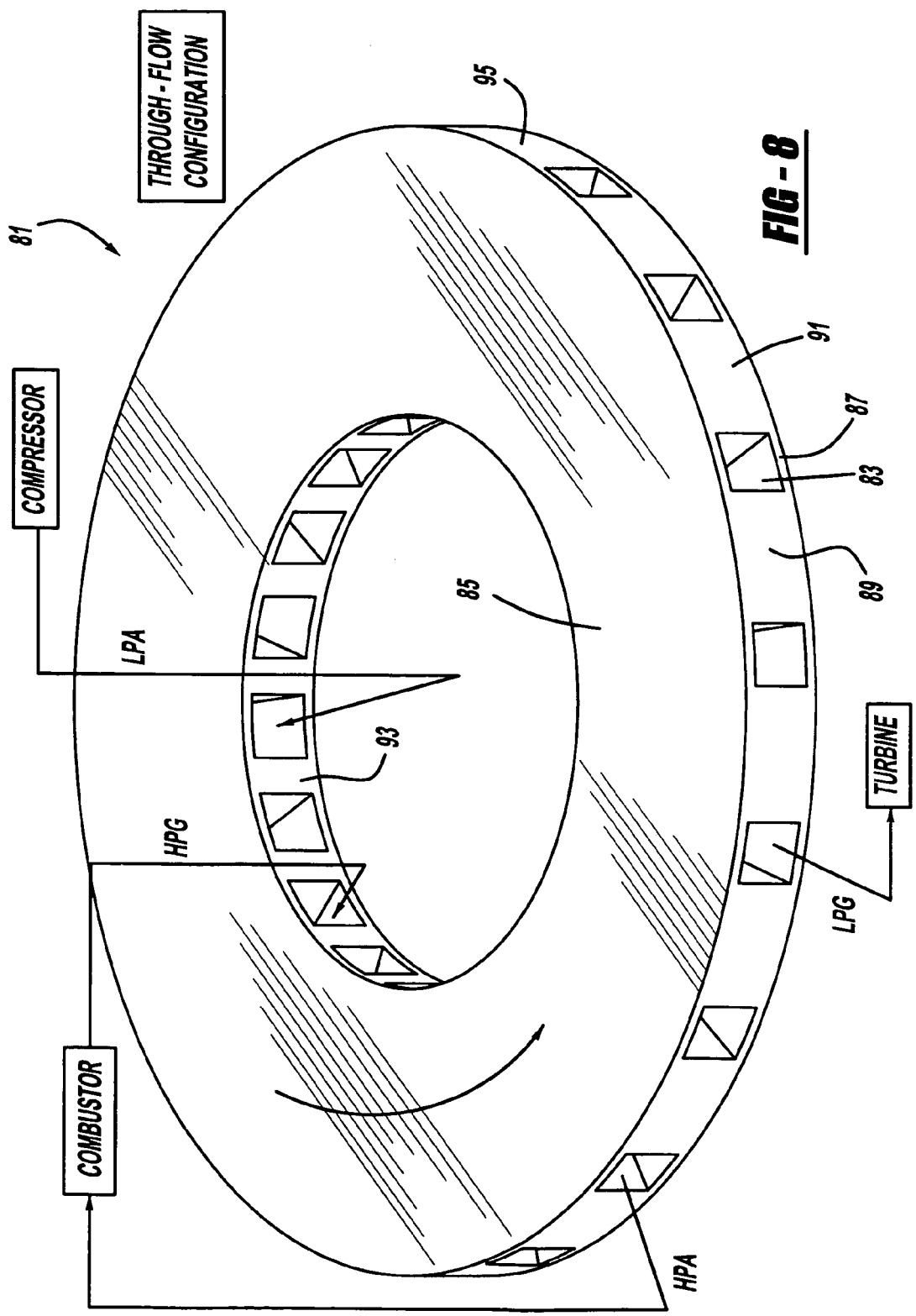

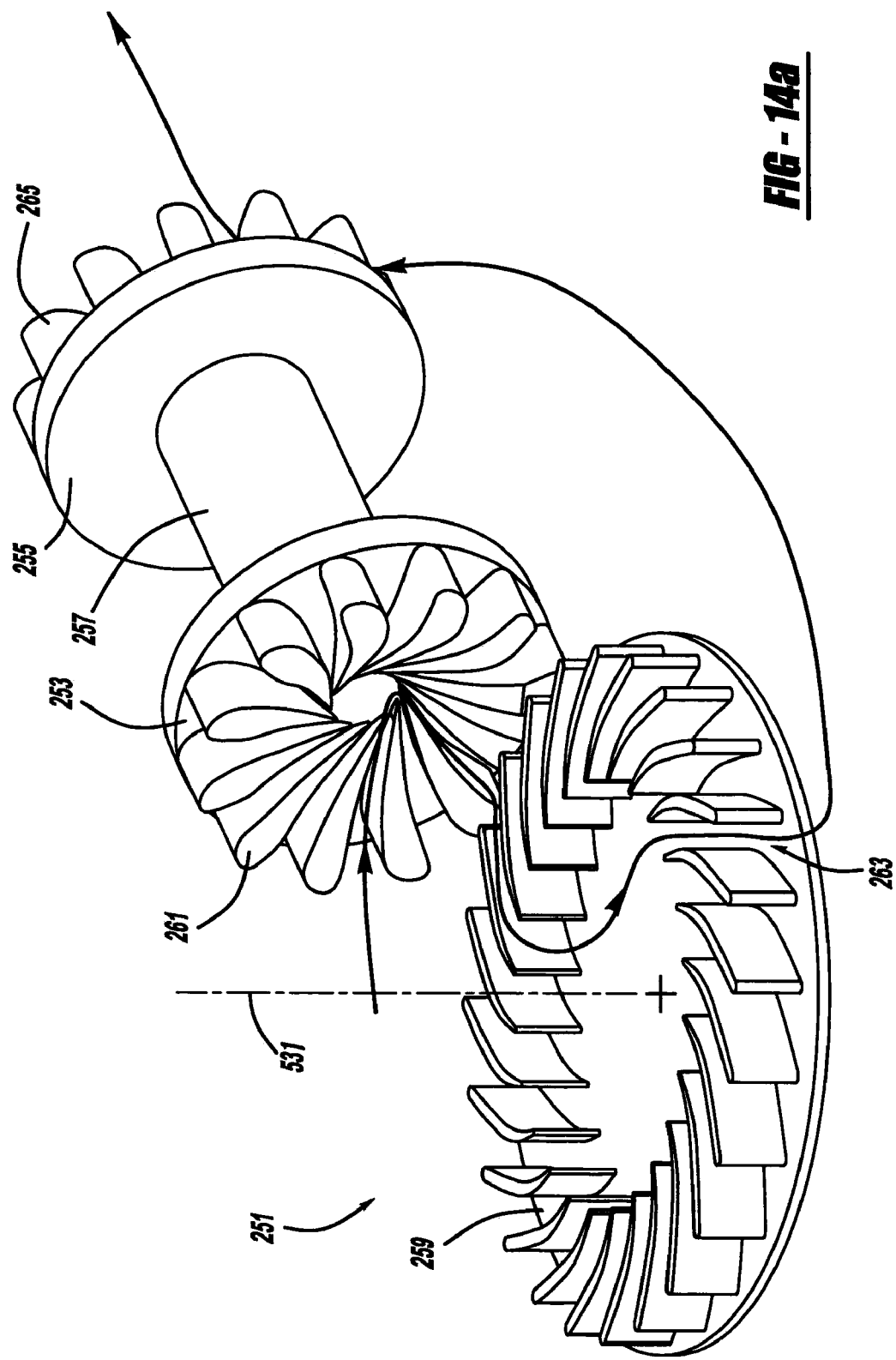

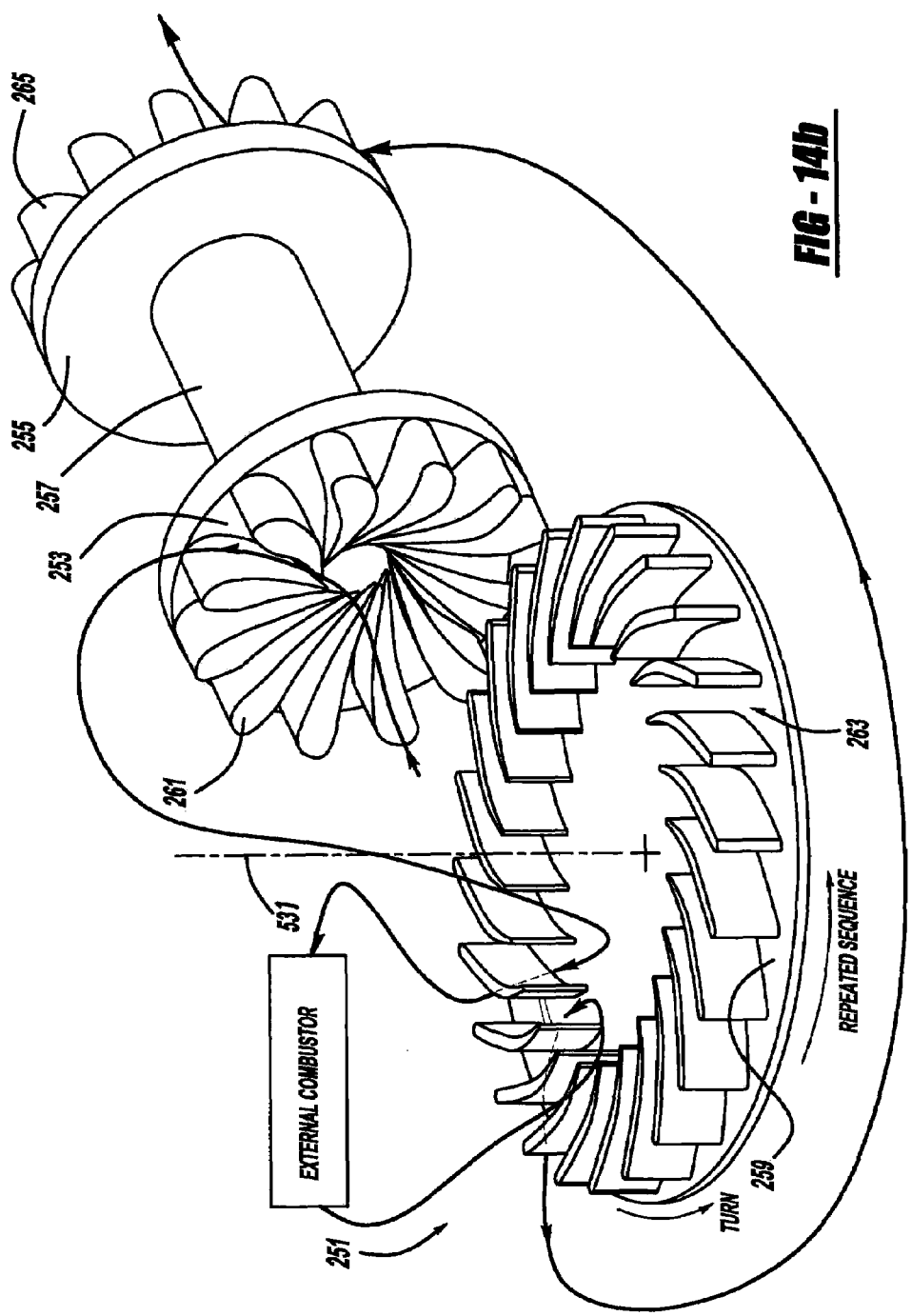

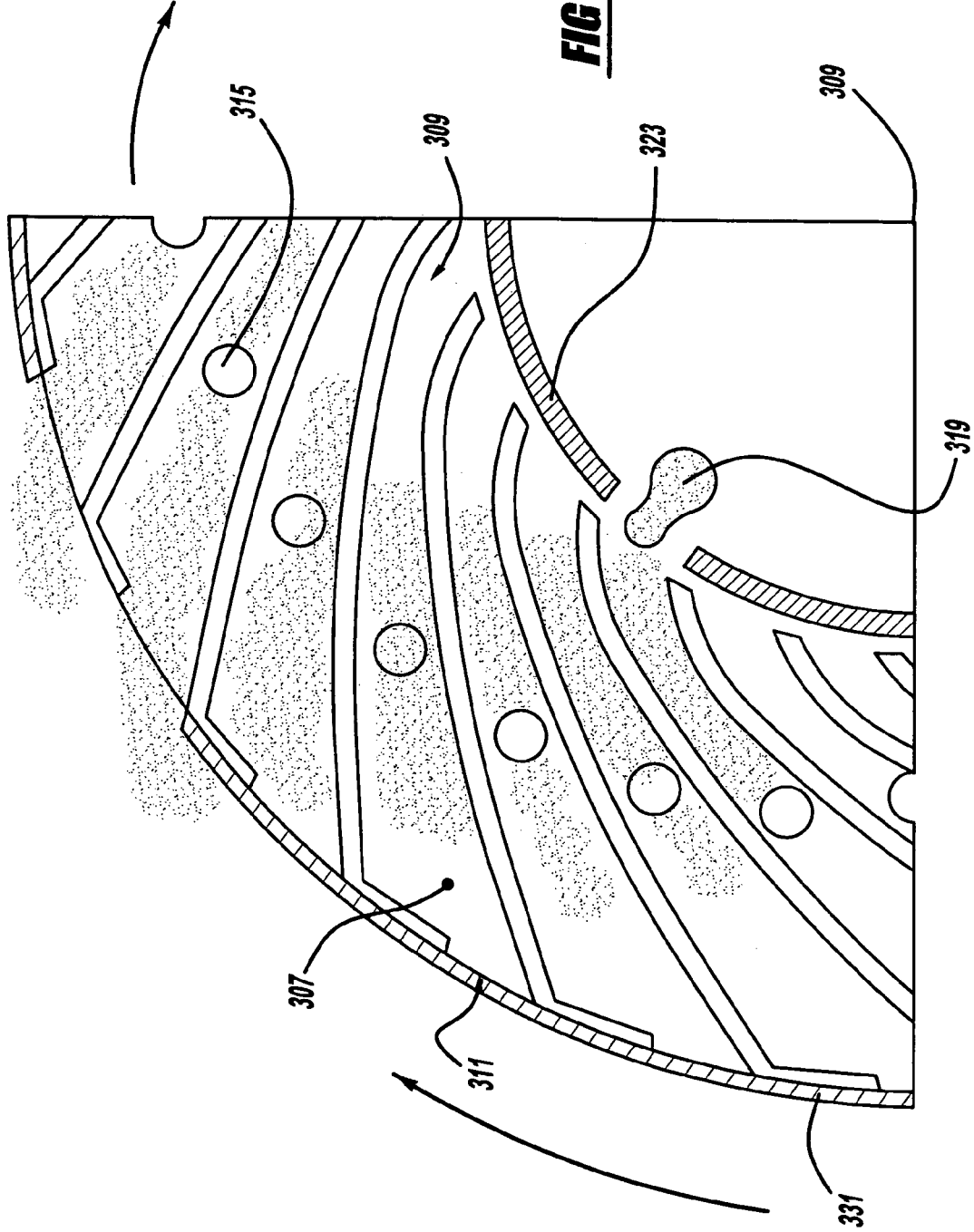

WAVE ROTOR APPARATUS

CROSS REFERENCE TO RELATED APPLICATIONS

This application claims priority to U.S. Provisional patent application Ser. No. 60/627,742, filed on Nov. 12, 2004, which is incorporated by reference herein.

BACKGROUND OF THE INVENTION

The present invention relates generally to fluid power devices and more particularly to a wave rotor apparatus.

It is known to use an axial wave rotor as a supercharger in internal combustion engines for automotive vehicles. This conventional device is described in P. Akbari and N. Müller, "Gas Dynamic Design Analyses of Charging Zone for Reverse-Flow Pressure Wave Superchargers," ICES 2003-690, ASME (May 11-14, 2003). Wave rotors have also been proposed for use in propulsive jet engines and power turbines as disclosed in U.S. Pat. No. 6,584,764 entitled "Propulsion Module" which issued to Baker on Jul. 1, 2003; and U.S. Pat. No. 5,894,719 entitled "Method and Apparatus for Cold Gas Reinjection in Through-Flow and Reverse-Flow Wave Rotors" which issued to Nalim et al. on Apr. 20, 1999; both of which are incorporated by reference herein. Various attempts have also been made to cancel an expansion wave generated by a wave rotor. Such a configuration is taught in U.S. Pat. No. 5,267,432 entitled "System and Method for Cancelling Expansion Waves in a Wave Rotor" which issued to Paxson on Dec. 7, 1993, and is incorporated by reference herein. Traditional attempts to use depressions or pockets to control wave reflections of off-design operation undesirably, reduce the sensitivity of axial wave rotors to engine speed changes. Nevertheless, there still exists a need to improve the performance and reduce the size of traditional wave rotors to enhance their commercial viability or adapt a different geometry for more convenient implementation.

SUMMARY OF THE INVENTION

In accordance with the present invention, a wave rotor apparatus is provided. In another aspect of the present invention, a radial wave rotor includes fluid passageways oriented in a direction offset from its rotational axis. A further aspect of the present invention employs stacked layers of generally radial channels in a wave rotor. Moreover, turbomachinery is located internal and/or external to a wave rotor in yet another aspect of the present invention. In another aspect of the present invention, a radial wave rotor has an igniter and fuel injector. Correctional passages are employed in still another aspect of the present invention wave rotor.

The radial wave rotor of the present invention is advantageous over conventional devices since the present invention should produce higher power densities, an improved efficiency, a smaller frontal area, and a smaller size compared to known axial wave rotors. The centrifugal forces of the fluid, created by the present invention, advantageously improve flow scavenging and compression. The offset or generally radial passageways of the wave rotor of the present invention are also easier and less expensive to manufacture as compared to many traditional, axial wave rotors, especially if incorporated into a layered arrangement. The stacked configuration and/or shapes of channels employed in the present invention further provide advantageous variations in cycle timing.

Moreover, performance of the radial wave rotor of the present invention is simpler to model, predict and analyze in the design stage than traditional wave rotors. Placing turbomachinery in the presently disclosed locations also reduces undesirable pressure losses caused by conventional collectors and/or diffusers. Additionally, the correctional passageways of the present invention advantageously achieve directed and self-actuated aerodynamic control of the internal flow and shock wave pattern. Scavenging processes are also improved by the present invention's use of centrifugal forces. Additional advantages and features of the present invention will become apparent from the following description and appended claims, taken in conjunction with the accompanying drawings.

BRIEF DESCRIPTION OF THE DRAWINGS

FIG. 4b is a partially fragmented side view showing variations to the wave rotor apparatus of FIG. 4a;

FIG. 5 is a perspective view showing a radial wave rotor employed in the first preferred embodiment of the wave rotor apparatus;

FIG. 8 is a perspective view showing one layer of a radial wave rotor employed in a third preferred embodiment of the wave rotor apparatus;

FIGS. 14a and 14b are diagrammatic and perspective views showing variations of a second alternate embodiment wave rotor apparatus;

FIG. 16 is a diagrammatic, fragmentary and top view showing a quarter of the third alternate embodiment wave rotor apparatus of FIG. 15;

DETAILED DESCRIPTION OF THE PREFERRED EMBODIMENTS

A wave rotor is a machine in which a fluid is pressurized by generally unsteady shock or compression waves and expanded by expansion waves. As a general principle for wave rotors used in a gas turbine engines, a wave rotor provides a pressure gain additional to that provided by a compressor. It also enables higher combustion end temperatures without raising a turbine inlet temperature since a portion of the energy of the burning gas exiting a combustion chamber is used in the shock compression to increase the pressure and temperature of the fresh air before it enters the combustion chamber. Accordingly, the pre-expanded burned gas is scavenged toward a turbine and channels of the wave rotor are reconnected to the compressor outlet, allowing fresh, pre-compressed air to flow into the wave rotor channels. Thus, wave rotors utilize a high-pressure fluid to transfer its energy directly to a low-pressure fluid when two fluids with different thermodynamic properties are brought into direct contact for a very short time, wherein pressure exchange occurs faster than mixing.

Figure 1:
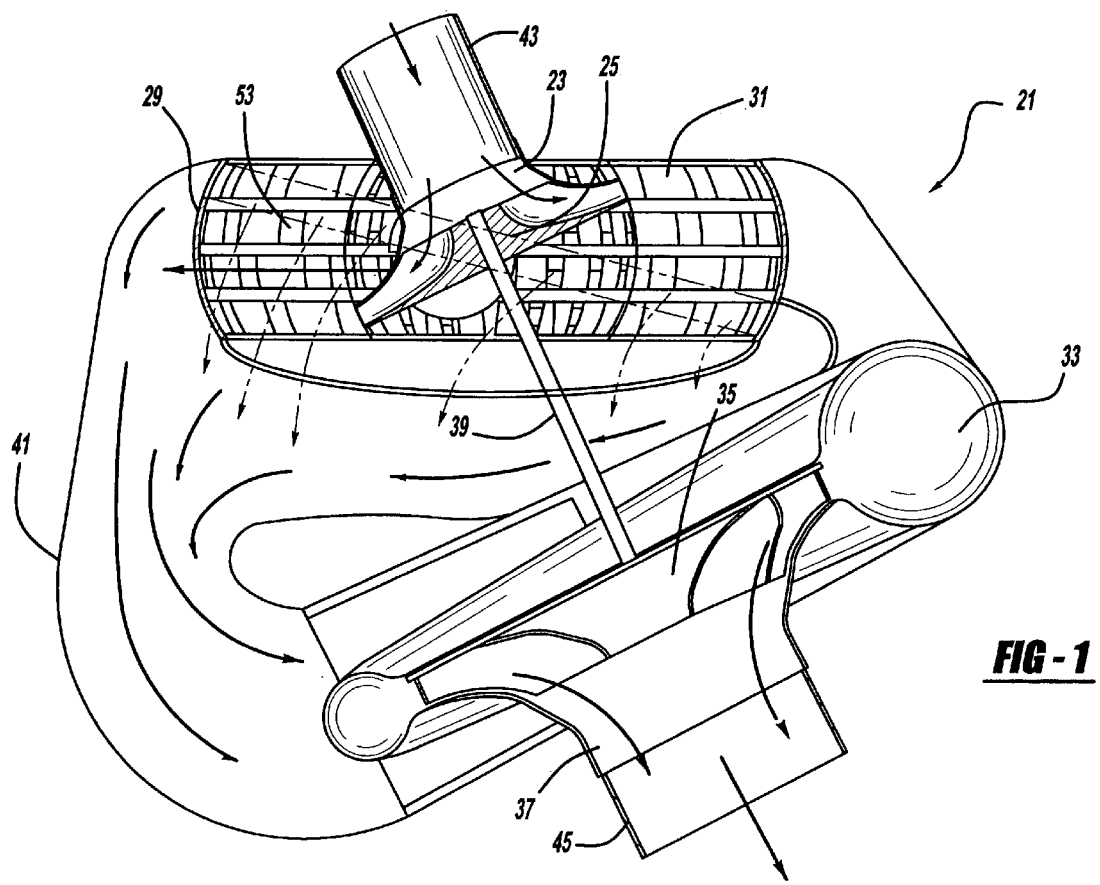
FIG. 1 is a diagrammatic side view showing a first preferred embodiment of a wave rotor apparatus of the present invention.
Figure 2:
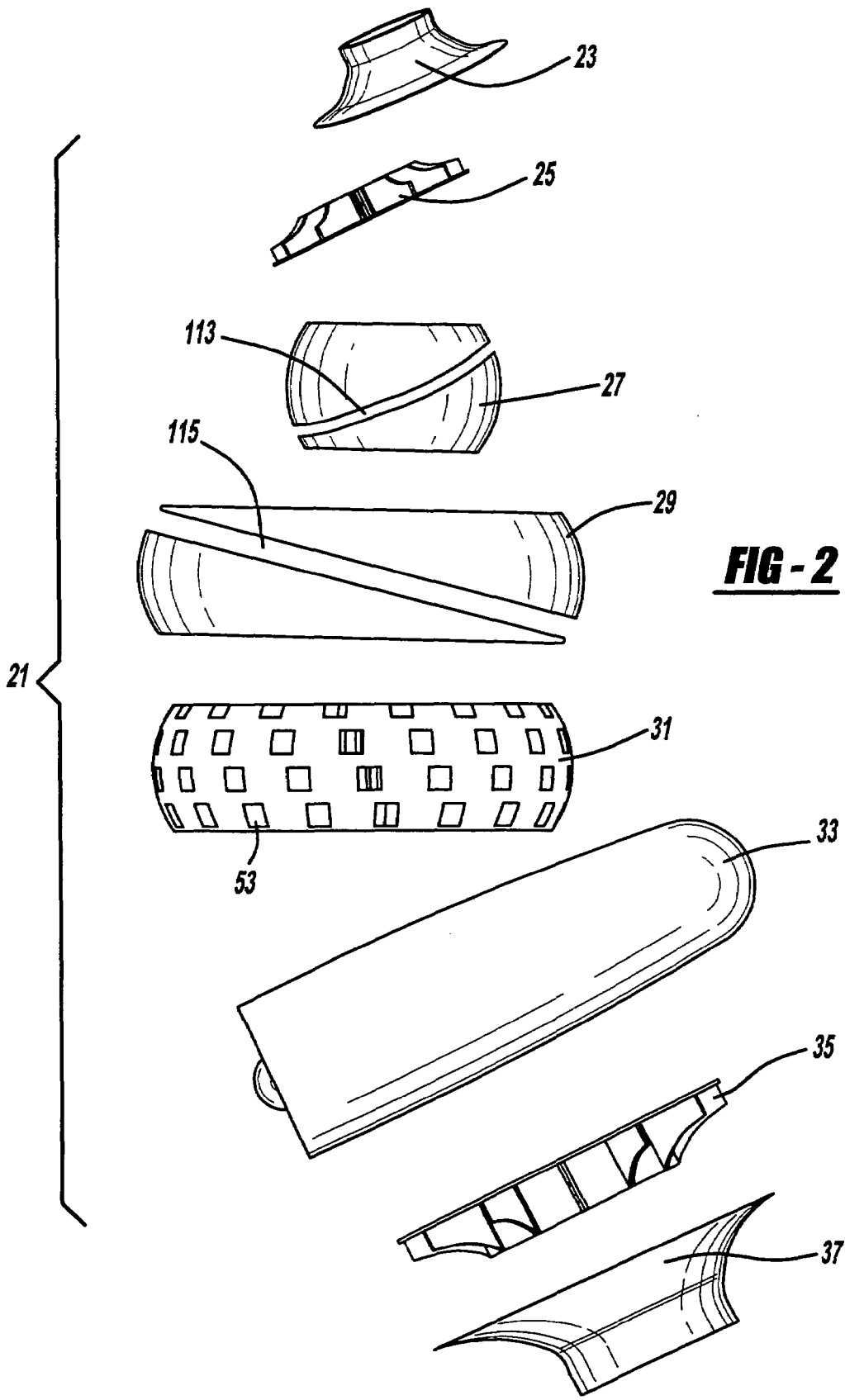
FIG. 2 is an exploded, side elevational view showing the first preferred embodiment of the wave rotor apparatus.
Figure 3:
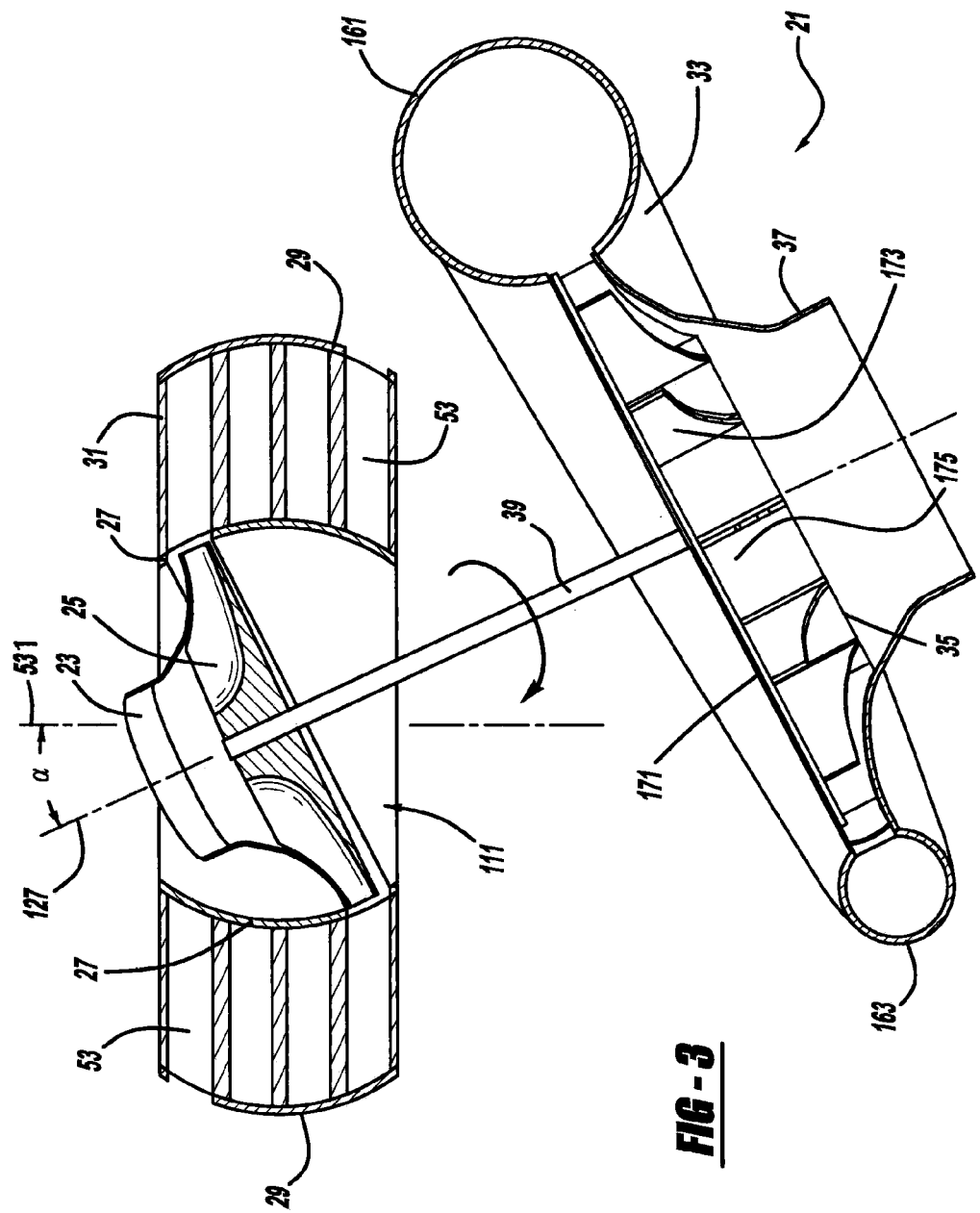
FIG. 3 is a partially fragmented and diagrammatic, side elevational view, showing the first preferred embodiment of the wave rotor apparatus.

A first preferred embodiment of a wave rotor apparatus 21 is shown in FIGS. 1-5 and 9-11. More specifically, FIGS. 1-3 illustrate wave rotor apparatus 21 including a compressor inlet port 23, a radial impeller or compressor 25, an internal end plate 27, an external end plate 29, a radial wave rotor 31, a turbine volute 33, a turbine exit port 37, a driving shaft 39, a housing 41, an inlet duct 43 and an outlet duct 45. Radial wave rotor 31 is preferably made from multiple, annularly shaped discs or layers 51 which each have multiple channels or passageways radially extending outward from a rotational rotor centerline axis 531 toward a peripheral surface. Channels 53 are created, for example, by simple welding, soldering, gluing channel walls on discs, a milling machine, an electrical discharge machine, chemical etching or the like in a metal or ceramic material. Four such layers 51a, 51b, 51c and 51d are disclosed, however, greater or fewer layers can be employed. The layers are stacked upon each other in a coaxial manner after machining and can be permanently fixed together through electric current welding, structural adhesives, bolts or the like. Alternatively discs with channels can be manufactured altogether in one manufacturing process like casting. Each channel 53 of the first preferred embodiment has a straight configuration in an elongated radial direction and a constant rectangular cross-sectional area from its inlet, closest to rotor axis 531, to its peripheral outlet. Furthermore, the channels of each layer can be circumferentially offset from the adjacent layers thereby forming a diagonal or oblique configuration to allow for different timing of fluid entry and exiting of the channels. The stacked layer construction provides a modular wave rotor that can have one or more easily interchanged layers for different mass flow rates. The subdivision of channels further advantageously allows for acoustic noise reduction. The internal surface and periphery of the stacked layers of wave rotor 31 have partially spherical shapes to improve fluid flow characteristics from compressor 25 and through the ported end plates, reducing losses otherwise appearing in ducting and collectors.

Figure 7:
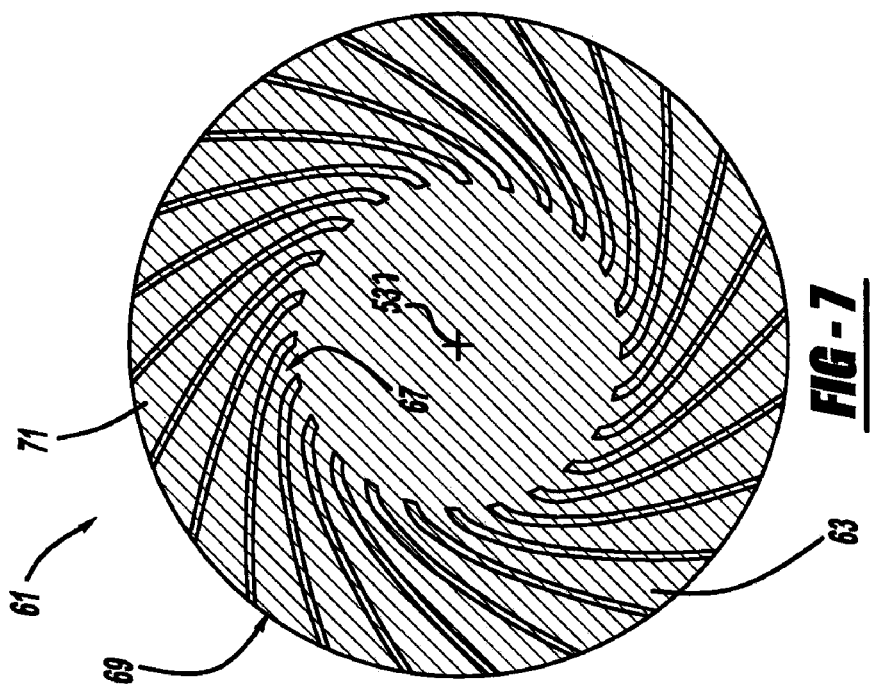
FIG. 7 is a diagrammatic top view showing one layer of the radial wave rotor employed in the second preferred embodiment of the wave rotor apparatus.
Figure 6:
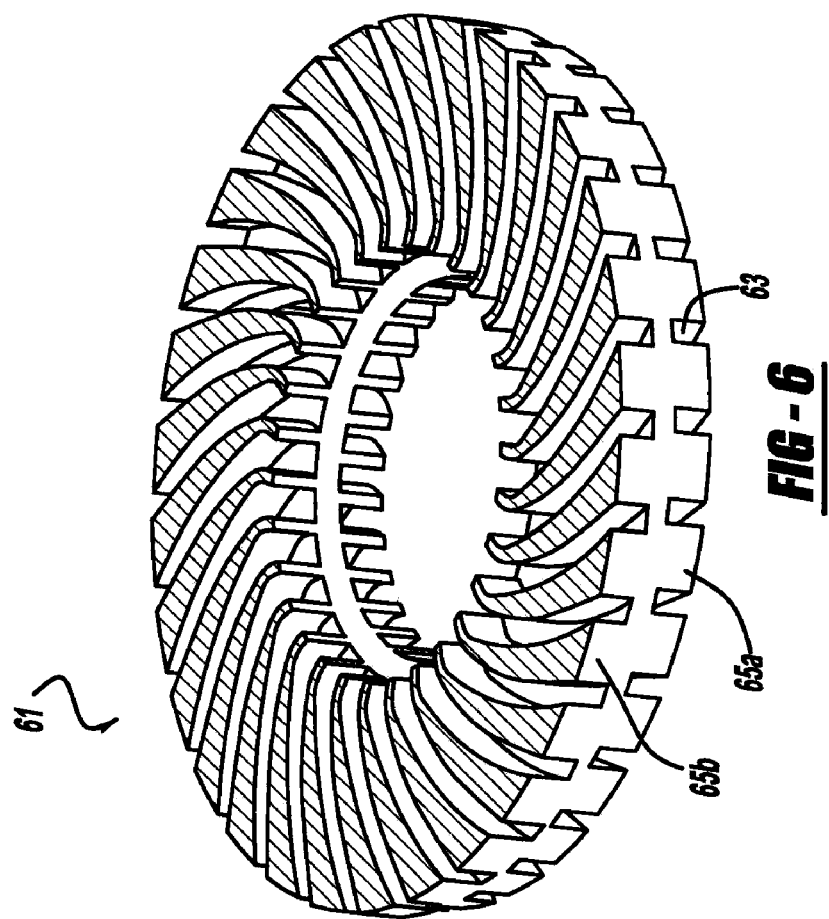
FIG. 6 is a partially fragmented, perspective view showing one and one-half layers of a radial wave rotor employed in a second preferred embodiment of the wave rotor apparatus.
Figure 9:
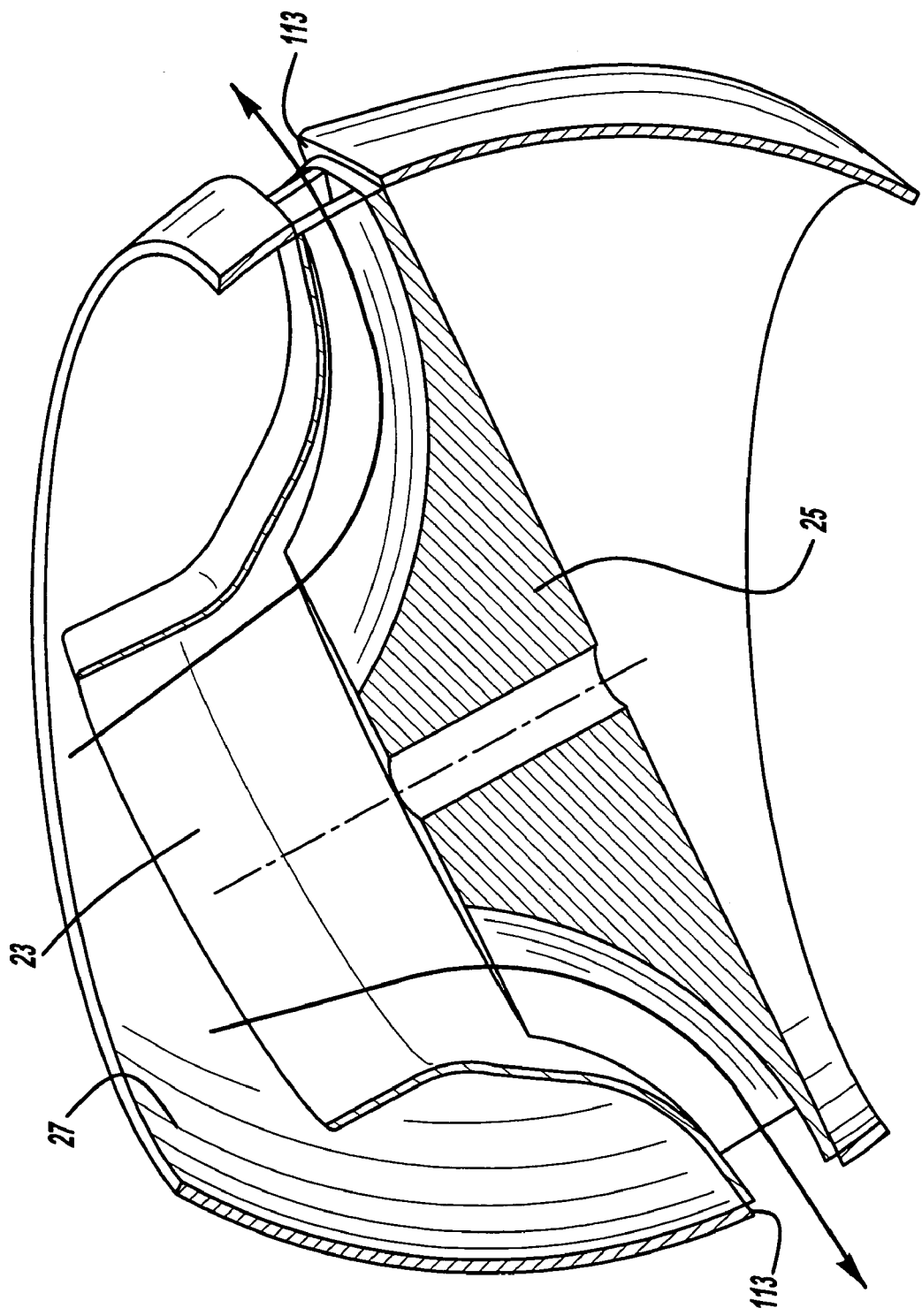
FIG. 9 is a cross-sectional view showing an inlet and compressor assembly employed in the first preferred embodiment of the wave rotor apparatus.
Figure 10:
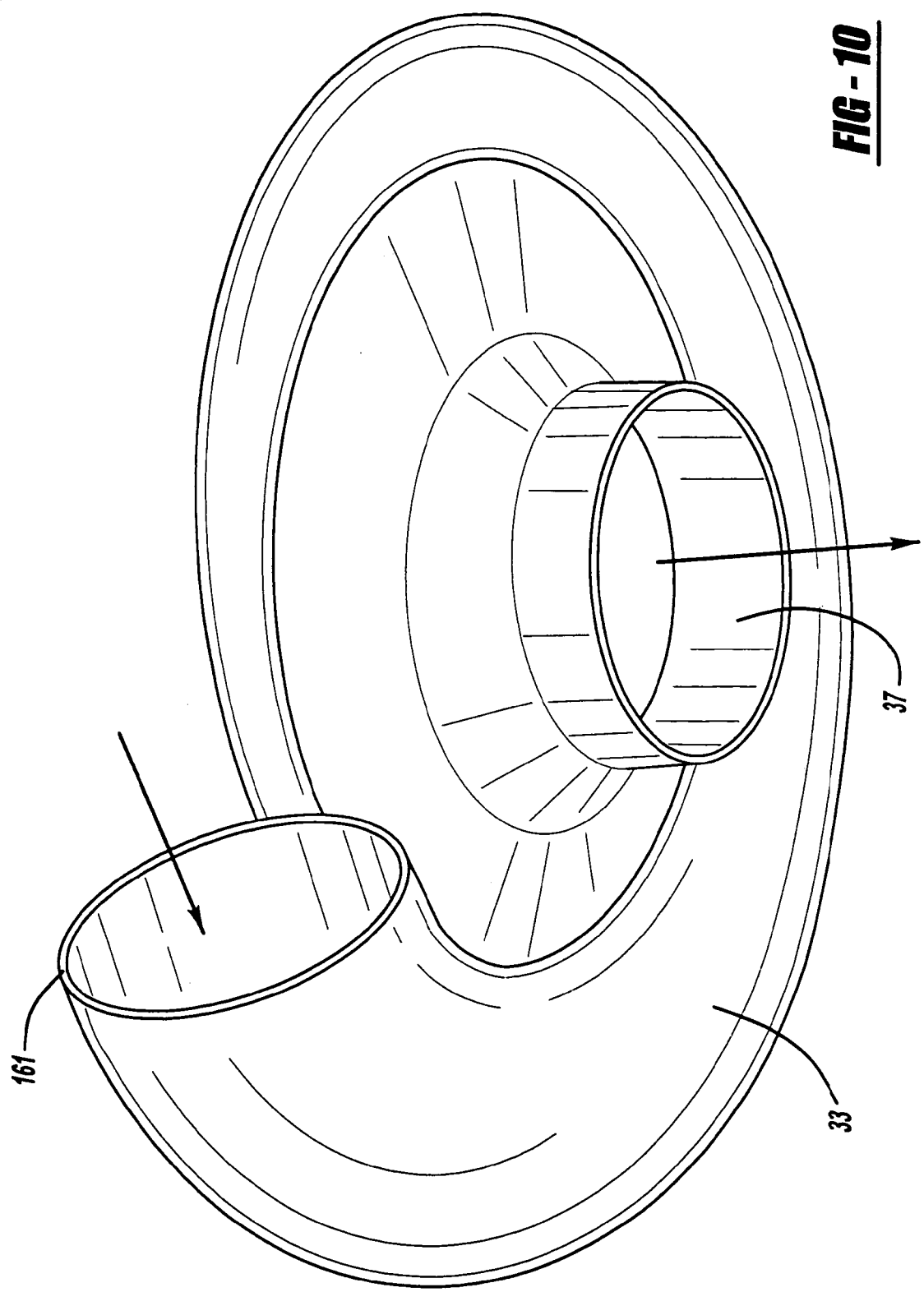
FIG. 10 is a perspective view showing a turbine volute employed in the first preferred embodiment of the wave rotor apparatus.
Figure 11:
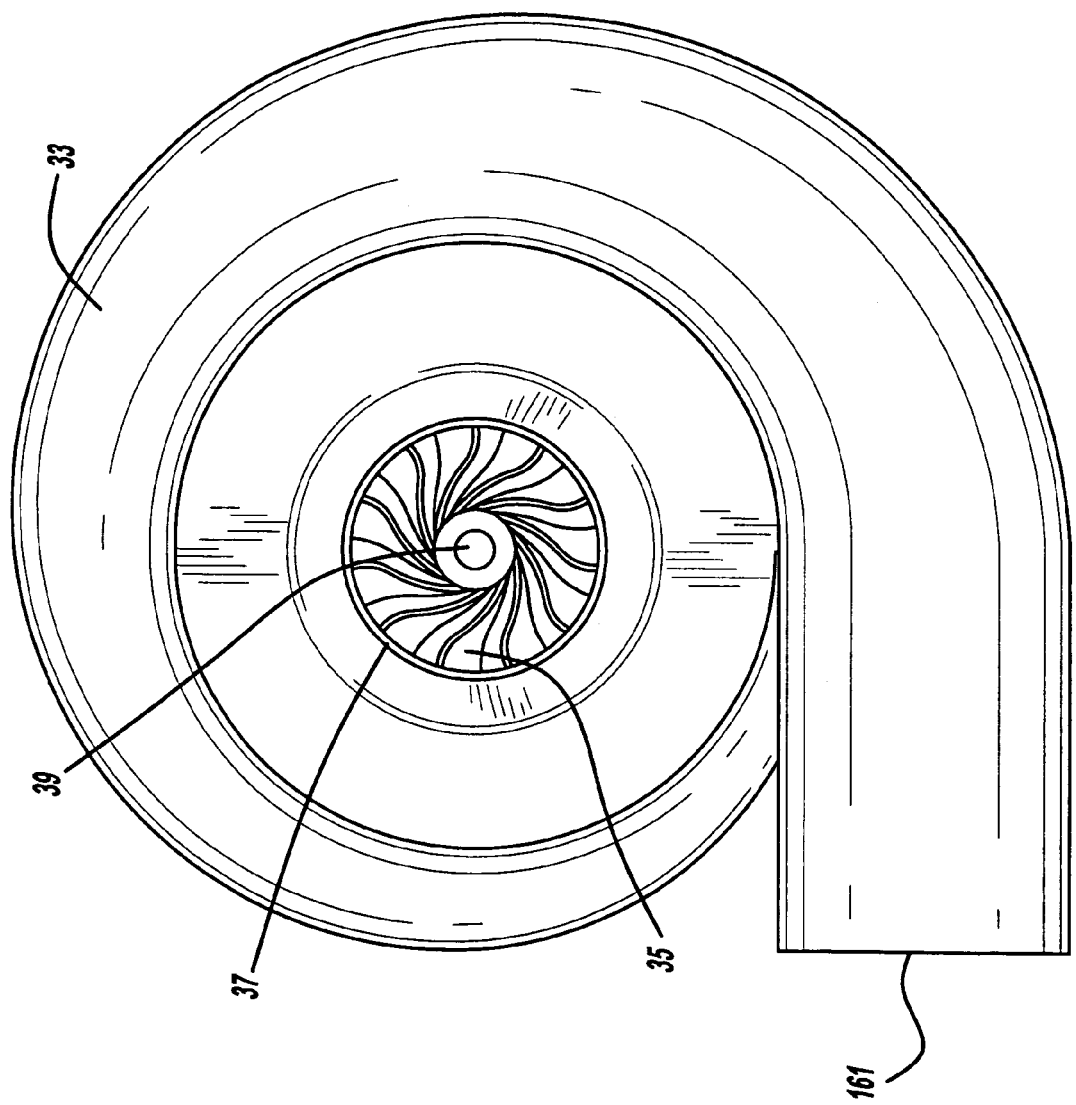
FIG. 11 is a top elevational view showing the turbine volute employed in the first preferred embodiment wave rotor apparatus.

FIGS. 6 and 7 illustrate a second preferred embodiment of a radial wave rotor 61 wherein multiple channels 63 in each of exemplary layers 65a and 65b have a curved configuration between each inlet 67 and outlet 69. In the embodiment shown, the cross-sectional area between inlet 67 and outlet 69 also varies with the curve radius being more severe adjacent to the inlet and gradually expanding adjacent the outlet. Solid partition portions 71 are transversely disposed between each set of channels 63, much like that illustrated in FIG. 5. Layer-by-layer manufacturing is ideally suited for the curved channel configuration, allowing non-die locked or free from undercut access to all of the channels within a single layer at the same time as viewed in Figure curved or otherwise angled configuration is ideally suited for a "free-running" wave rotor where the impulse of entering or exiting fluid or the change of angular momentum of the internal flow self-drives the rotation of the wave rotor. The curved flow path of channels 63 of the second preferred embodiment advantageously provides a longer flow path given the same rotor diameter and packaging size thereby modulating the effect of radial forces on the flow to improve scavenging and acceleration/deceleration of the flowing fluid. This also advantageously allows for tuning of the design by changing shapes and flow lengths also in each layer differently, without affecting packaging size, thus changing wave travel timing. With the curved channels, angles can be easily varied in the design stage which will modulate the flow direction and acting accelerating/decelerating centrifugal force while also allowing the inlet and outlet angles to be independently varied.

Referring to FIG. 8, a third preferred embodiment of a radial wave rotor 81 employs multiple straight channels 83 with each having its square cross-sectional area completely bordered by an upper wall section 85, a lower wall section 87, a left wall section 89 and a right wall section 91 (in the orientation shown). This embodiment enhances structural rigidity of each layer and employs completely circular-cylindrical internal and external surfaces, respectively 93 and 95, thereby reduced manufacturing costs and modularized interchangeability of the multiple layers (only one of which is shown) when assembled. The geometric complexity and manufacturing costs of the associated end plates are also reduced. If applied with a gas turbine, the high pressure air ("HPA") and high pressure burned gas ("HPG") flow to and from combustor (burner) and the low pressure fresh air ("LPA") from the compressor to wave rotor 81, and the low pressure mixed gas ("LPG") to the turbine, are also schematically illustrated.

Figure 12:
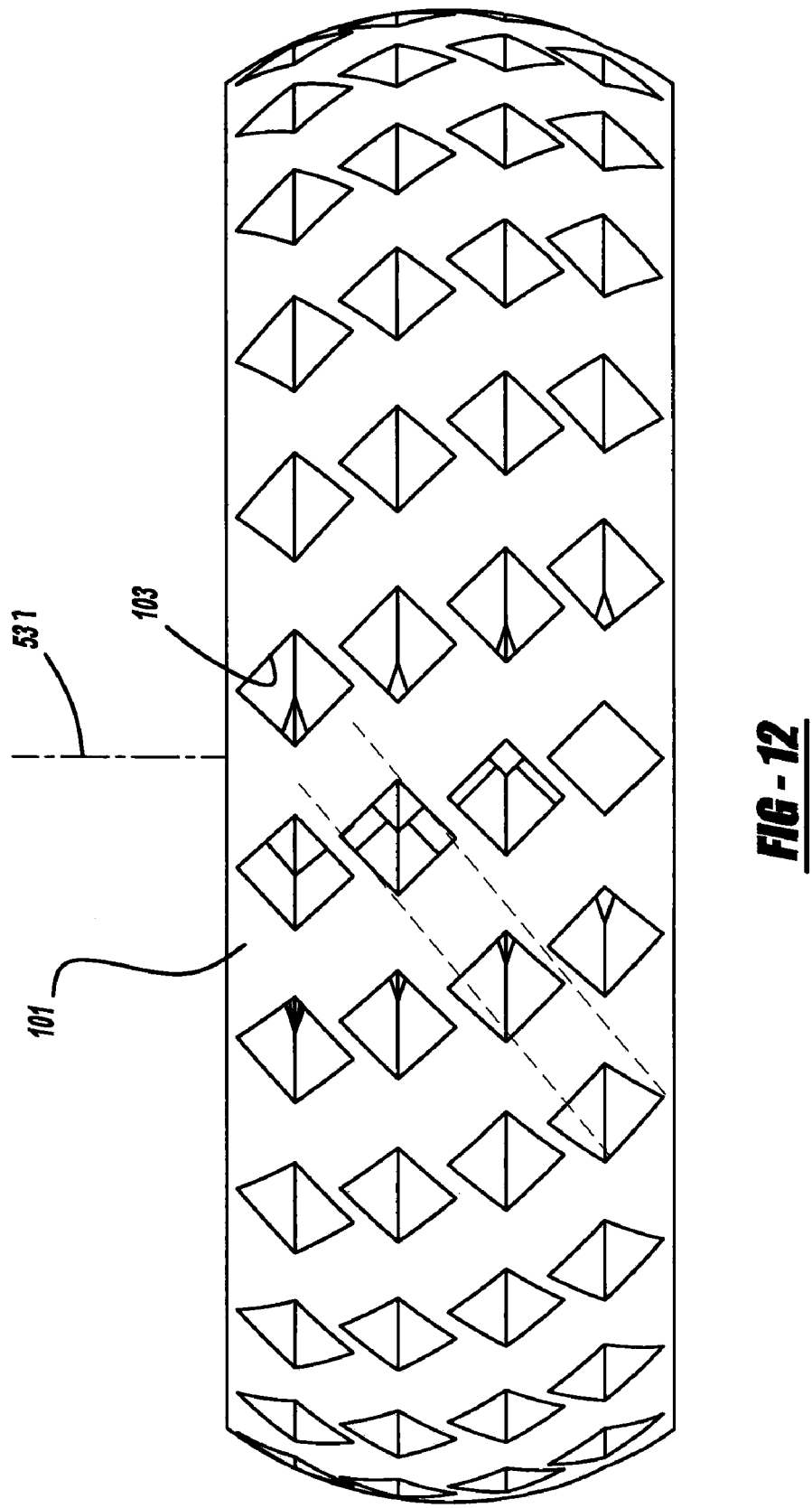
FIG. 12 is a side elevational view showing a radial wave rotor employed in a first alternate embodiment wave rotor apparatus.

It should alternately be appreciated that multiple layers of channels can be created within a single piece, radial wave rotor which does not require subsequent layer assembly; such an arrangement is shown in FIG. 12. This single piece, radial wave rotor 101 is constructed to have multiple sets of fluid carrying channels 103 with each having a diamond-shape in cross-section, relative to rotational rotor axis 531. The diagonal or oblique offset of adjacent channel openings can be observed between different rows or layers. The diamond-shape allows for more abrupt opening and closing as full channel inlet and outlet-to-end plate porting alignment is achieved during operation, especially given the preferred end plate ports disclosed hereinafter. It should also be appreciated that other channel shapes can be used and that small fillets or radii can be employed in the cross-sectional corners without significantly departing from the desired square, rectangular or diamond shapes disclosed herein.

With reference now to FIGS. 2-4a and 9, internal end plate 27 is located within a central and internal hollow cavity 111 of radial wave rotor 31. Internal end plate 27 has a diagonally elongated port 113 which selectively and periodically aligns with opposite diagonal groups of wave rotor channels 53 when wave rotor 31 is rotated relative to the stationary internal end plate 27. Similarly, external end plate 29 has a diagonally elongated port 115, preferably oriented opposite to internal end plate port 113. External end plate 29 is stationarily positioned in matching registry and shape with the circumferential peripheral surface of wave rotor 31 such that, for example, diagonal groupings of outlets of wave rotor channels 53 are selectively and periodically aligned with port 115 when wave rotor 31 is operably rotated. It should be appreciated that alternate end plate shapes and orientations can be employed depending upon the wave rotor peripheral shape, channel shapes, channel spacings and flow patterns desired for different applications. End plates 27 and 29 are secured to housing 41 (see FIG. 1) or ducts by mounting brackets, welding or the like. Furthermore, bearings, seals and/or lubricants may be desired between various rotating components and members, and the adjacent stationary components, depending upon the applications within which the present invention is employed.

Compressor 25 is a rotating turbomachinery component that can be positioned inside of internal end plate 27 and cavity 111 of radial wave rotor 31. Compressor 25 includes a base (disc) 121, a plurality of curved, fluid-impinging vanes 123 and a central hub 125. A rotational compressor axis 127 coaxially extends through hub 125 and vanes 123. Compressor axis 127 is angularly offset from axis 53 of radial wave rotor 31 by an angle $\alpha$ of between about 10-80 degrees, and more preferably by about 25 degrees. The majority of compressor inlet port 23 is also stationarily disposed within internal end plate 27 and wave rotor cavity 111. Compressor 25 is allowed to rotate independently of radial wave rotor 31 at least when no fluid is flowing and in certain potential operating conditions. When fluid is flowing, compressor 25 rotates in generally the same direction as radial wave rotor 31, however, the angles and curves of vanes 123 of compressor 25 can be varied and/or inlet and channel angles of radial wave rotor 31 can be varied to cause opposite and/or the same rotational direction between the compressor and radial wave rotor. It should be appreciated that alternate turbomachinery members, such as turbines or the like, may be rotationally provided within an internal cavity, whether central or not, of wave rotor 31. The angularly offset axes 53 and 127 between compressor 25 and wave rotor 31 create a continuous interface flow at the inner and outer periphery of external turbomachinery shown in FIG. 4b and the internal turbomachinery shown in FIG. 4a. In the shown configuration, the stack of wave rotor layers 51, also called wave disks, advantageously allows continuous outflow of fluid from the turbocompressor without need of any collecting devices that would otherwise generate unnecessary losses like pressure loss due to wall friction.

As best observed in FIGS. 1-3, 10 and 11, turbine 35 is rotatably located within a turbine volute 33. Turbine volute 33 is stationarily mounted to housing 41 and is in fluid communication with port 115 of external end plate 29 through volute openings 161 and 163 and intermediate ducts. Turbomachinery-turbine 35 can rotatably spin within volute 33 and be mechanically coupled to compressor 25 in a direct manner by way of drive shaft 39 or, alternately, through other gearing or belt arrangements which may be coaxial or offset or electrically by a generator motor arrangement (see FIG. 4b). Turbine exit port 37 is mounted to volute 33 adjacent and coaxial with turbine 35. Shown turbine 35 has a generally flat base 171, curved vanes 173 projecting from base 171, and a central hub 175 aligned with drive shaft 39. However, an axial turbine could be additionally employed with or without a volute.

Wave rotor apparatus 21, as disclosed with the first preferred embodiment, shows the use of a radial wave rotor as a topping component for a gas turbine and is intended for use within an aircraft, jet engine, a stationary, electricity-producing power plant or for propelling other vehicles like land or water vehicles. With slight modification, the radial wave rotor apparatus of the present invention can also be used as a supercharger within an internal combustion engine, such as that employed in an automotive land vehicle, as a pressure exchanger in air or other gas refrigeration cycles, or as a condensing wave rotor, for example, in a water based refrigeration system. One such exemplary water refrigeration system is disclosed in U.S. Pat. No. 6,427,453 entitled "Vapor-Compression Evaporative Air Conditioning Systems and Components" which issued to Holtzapple et al. on Aug. 6, 2002, and is incorporated by reference herein. Another is disclosed in Akbari, P., Kharazi, A., Müller, N., "Utilizing Wave Rotor Technology to Enhance the Turbo Compression in Power and Refrigeration Cycles," 2003 International Mechanical Engineering Conference, ASME Paper IMECE 2003-44222 (2003). Radial wave rotor 31 offers great potential and advantages for a condensing wave rotor in a vapor (phase change) refrigeration system, since it exploits the enormous density differences of gaseous and liquid fluid by the action of centrifugal forces. This greatly supports the separation of vapor and condensed fluid in the scavenging process and channel drying before refilling, which addresses a concern in handling of phase changes occurring in both directions in conventional, axial wave rotors.

Figure 4A:
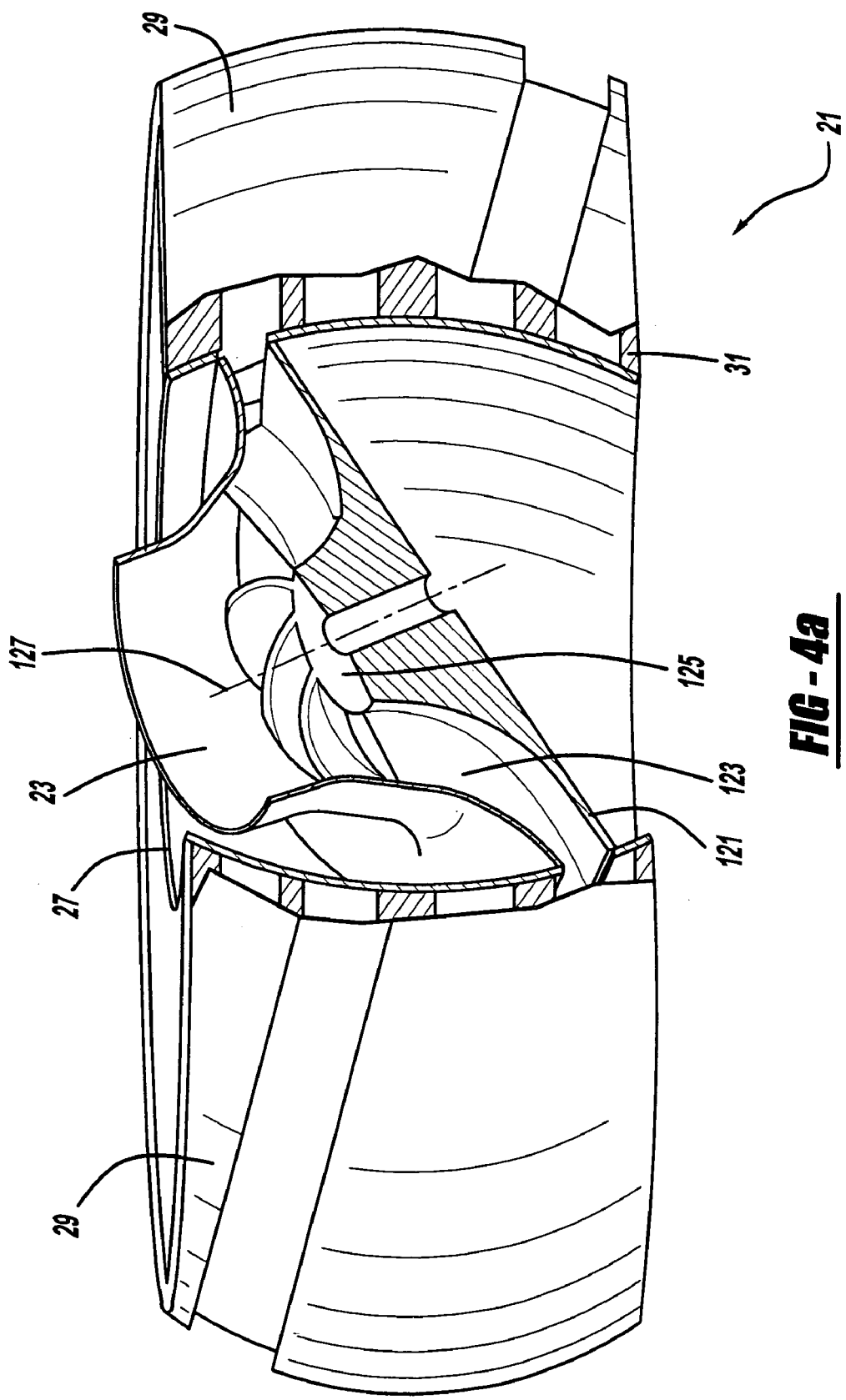
FIG. 4a is a partially fragmented side view, showing the first preferred embodiment of the wave rotor apparatus.
Figure 4B:
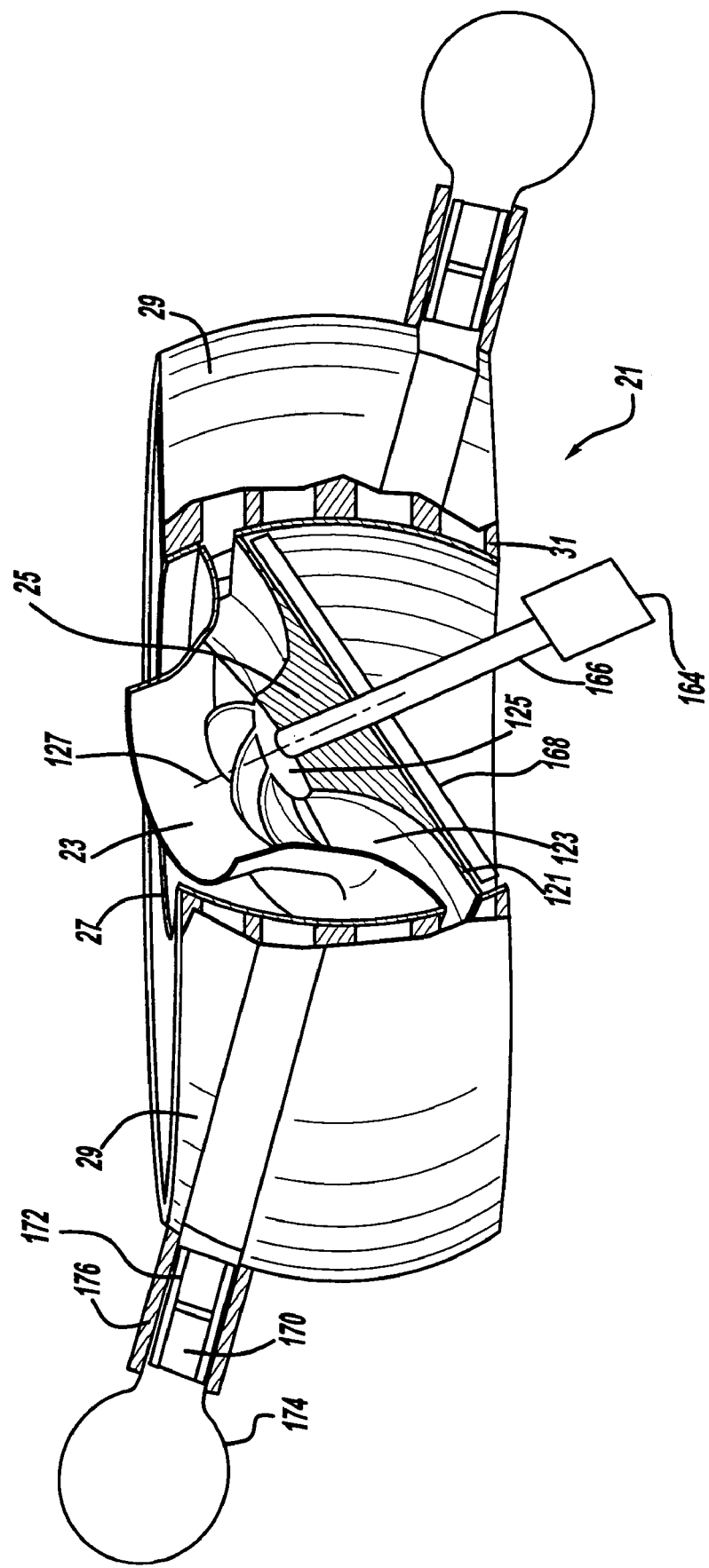

FIG. 4b illustrates a first configuration employing an externally located motor or generator 164 coupled to either a turbine or compressor 25 by a coaxially aligned shaft 166. A second configuration uses a flat and disc-like shaped generator or motor 168 coupled to compressor 25 and positioned within internal end plate 27 in an offset angular manner. Motor 168 is preferably of a permanent magnet type due to its simplicity and higher efficiency, and includes magnets that rotate with the compressor via a shaft, geared or direct coupling, and stationary electrical coils. Alternately, motor 168 may be of an induction type, and this internal cavity arrangement can alternately be employed in an axial wave rotor although some radial wave rotor advantages will not be realized. A third configuration provides a motor or generator integrated into the compressor's hub 125. A fourth configuration locates a turbine 170 in a direct and generally radial flow path with the outlet ports of external end plate 29, defined by a housing 172 and a volute 174. A motor or generator 176 is driven by turbine 170 and is attached to housing 172 in an annular manner surrounding radial wave rotor 31.

Figure 18:
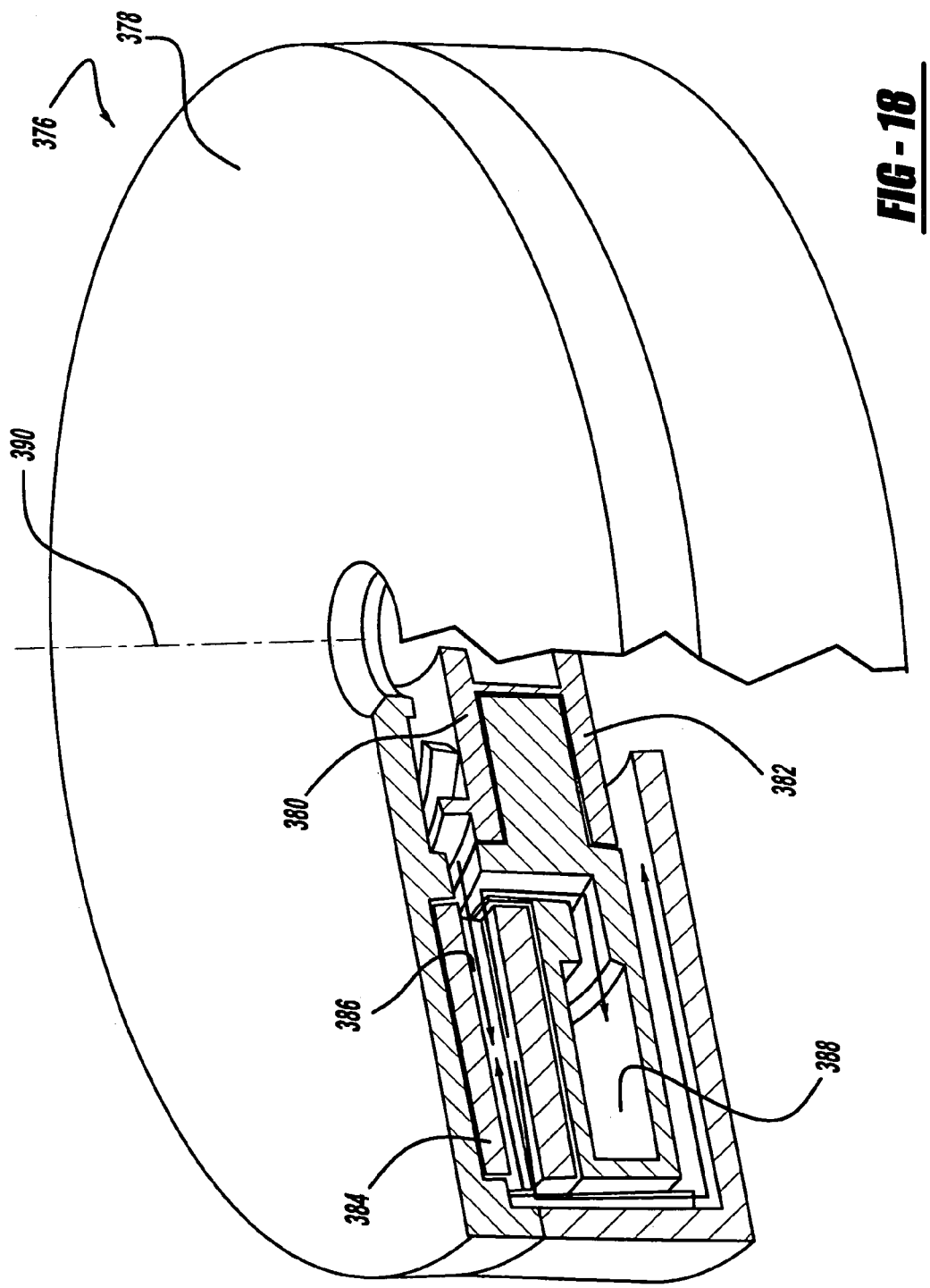
FIG. 18 is a fragmentary perspective view showing a fourth preferred embodiment wave rotor apparatus employed with a microfabricated gas turbine.

Further, a fourth preferred radial wave rotor embodiment is shown in FIG. 18 for use in conjunction with a microfabricated gas turbine like that disclosed in U.S. Pat. No. 5,932,940 which issued to Epstein, et al. on Aug. 3, 1999; and U.S. Pat. No. 6,392,313 which issued to Epstein, et al. on May 21, 2002; both of which are incorporated by reference herein. The radial wave rotor allows for incorporation of the wave rotor in the disc or wafer-based assembly without introducing additional flow bends (which would cause additional losses) like a conventional axial wave rotor would require. A MEMs micromachine engine 376 includes a housing 378, compressor 380 and turbine 382 of very small size; for example, the housing has an outer diameter less than 100 millimeters and more desirably about 12 millimeters, with a thickness of about 3 millimeters. Compressor 380 is located within an internal cavity of a radial wave rotor 354, which has radially elongated channels 386. A combustion chamber 388 is stationarily affixed to housing 378 while compressor 380, wave rotor 384 and turbine 382 are allowed to rotate about axis 390. In such a small scale, efficiency of compressor 380 and turbine 382 are traditionally very low. Also, the compression ratio is low for one step compression in traditional devices. Use of radial wave rotor 384, however, increases the total compression ratio. It is expected that the radial wave rotor advantageously rotates less than about 100 rpm while the turbine and compressor rotate at speeds reaching one million rpm, in the reverse-flow configuration shown.

Figure 15:
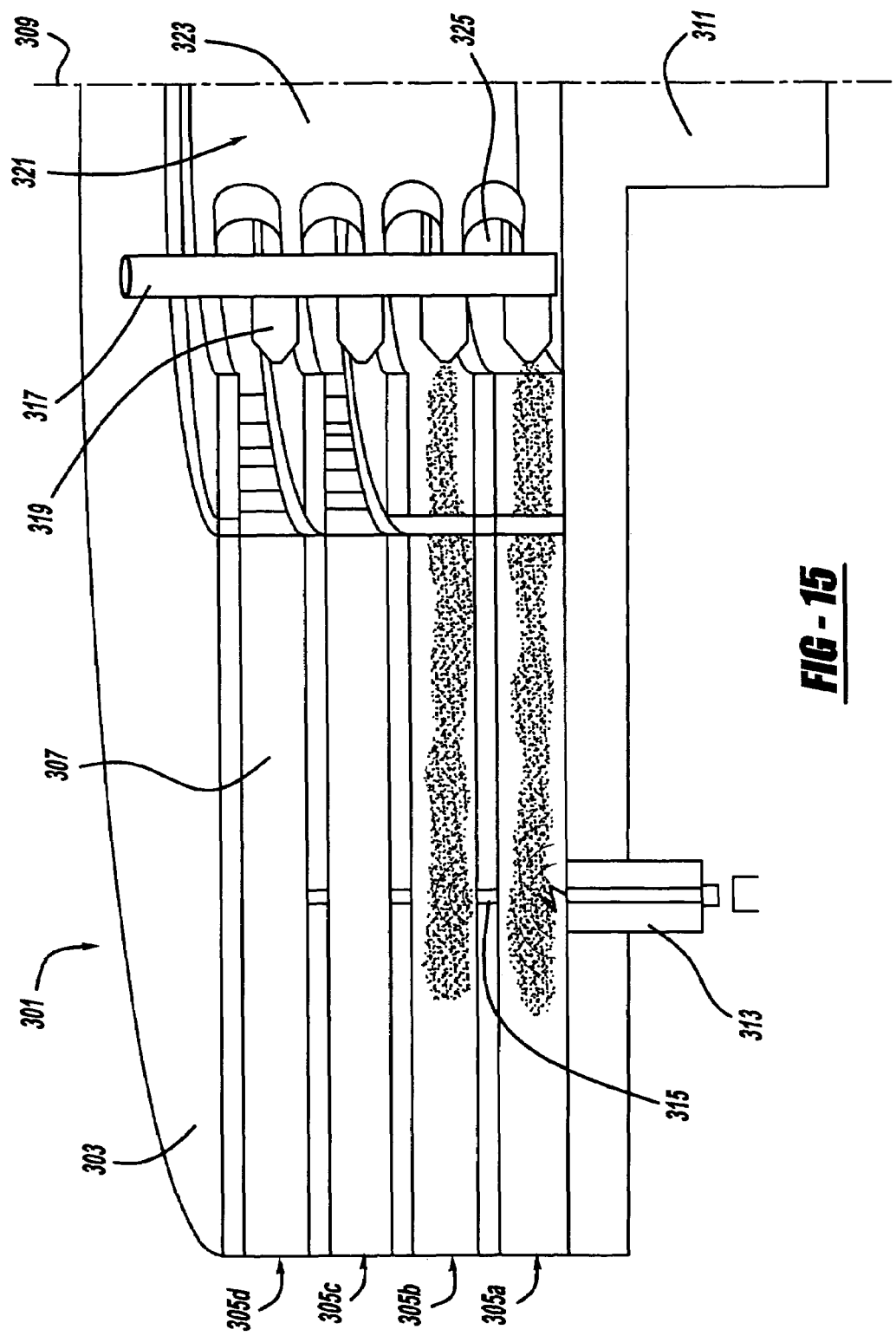
FIG. 15 is a fragmented, diagrammatic and perspective view showing a quarter of a third alternate embodiment wave rotor apparatus.

The first preferred embodiment wave rotor apparatus 31 operates as follows. Fresh air enters air intake 43 and flows to compressor inlet port 23. Rotation of turbine 35 mechanically causes compressor 25 to also rotate, which, in turn, forces the intake air into the radial wave rotor channels 53 when they are aligned with port 113 of internal end plate 27. Expanded and burned gases exiting outlet duct 45 may go through supplemental conduits or ducts, or a jet nozzle (not shown). The air inserted from compressor 25 to wave rotor channels 53 is preferably of a non-supersonic flow and will generate unsteady shock waves inside channels 53 due to pressure differences between the compressor outlet and the temporarily lower pressure in channels 53. The centrifugal force additionally supports the flow in channel 53. The radial action of wave rotor 31 improves scavenging and acceleration of fluid within each channel. The fluid flowing action from compressor 25 and through wave rotor channels 53 can also serve to rotate radial wave rotor 31, after which, the burned gases exit the channels aligned with port 115 of external end plate 29. The radial wave rotor alternately may be driven by a gear and/or electrical motor. In the case of a fluid driven wave rotor, the wave rotor may extract even more energy from the fluid and drive an additional generator connected to it or integrated in it and the housing. The periodical exposure of the channels to the port openings in the end plates initiates compression and expansion waves that move through the wave rotor channels and internally generate an unsteady flow in the wave rotor. Thus, pressure is exchanged dynamically between high pressure and low pressure fluid utilizing unsteady pressure waves such that both compression and expansion are accomplished in the single component, being the wave rotor. In the preferred embodiment, combustion takes place (as shown in FIGS. 14-15) within the channels in the form of deflagration or even detonation, generating the major shock wave while further compressing the fluid before it exits toward the turbine and generates an expansion wave that draws in fresh pre-compressed air from the compressor. The exiting pre-expanded gases flow to volute 33 and impinge upon vanes 173 of turbine 35, thereby forcing the turbine to rotate. The expanded gases are subsequently exhausted and exit from turbine exit port 37 and outlet duct 45 to atmosphere. The channel wall temperature of the wave rotor is maintained between the temperature of both fluids through the periodic exposure of the channels to both fluids between which the pressure is exchanged, thereby providing a self-cooling feature.

Figure 13A:
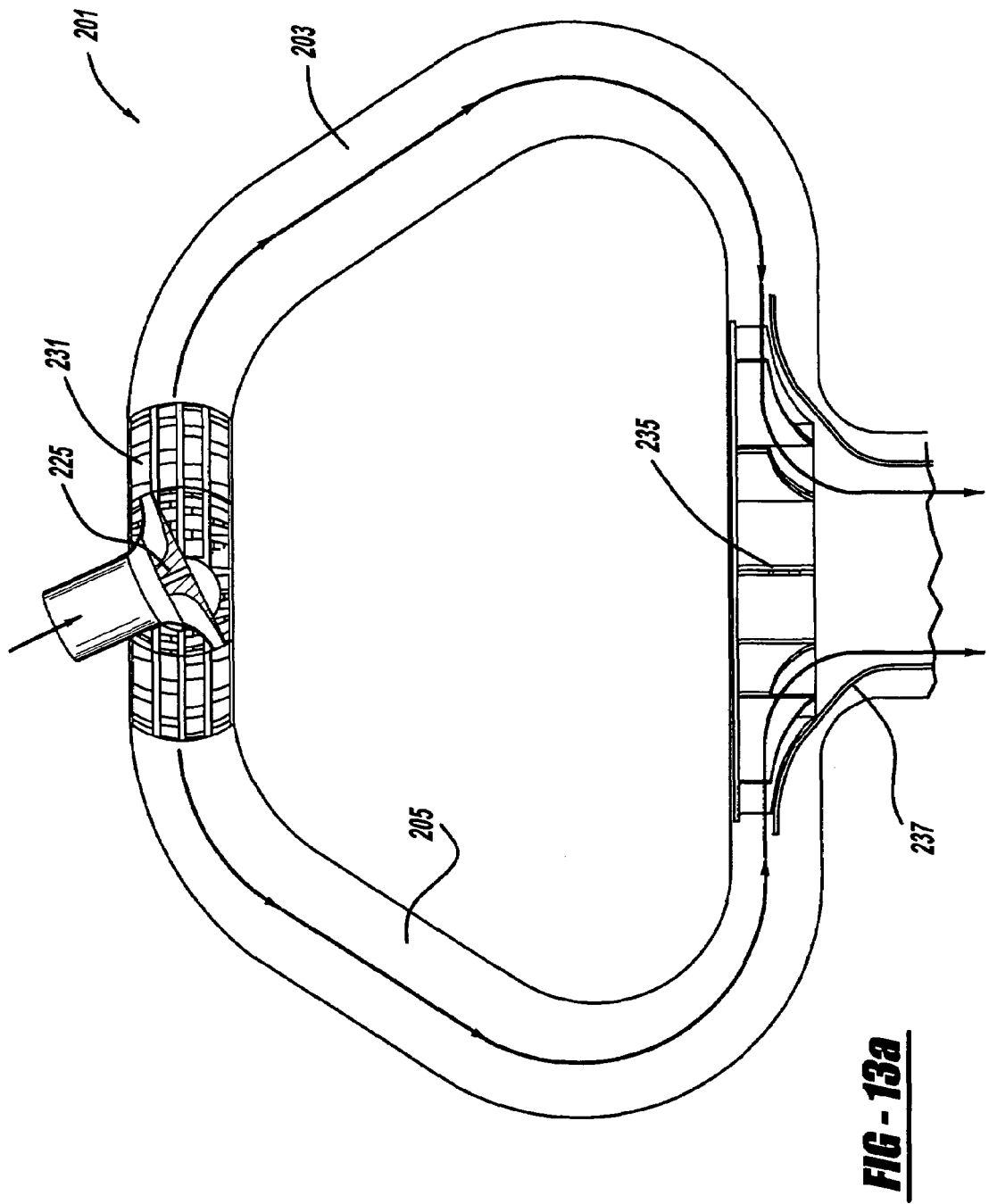
FIGS. 13a and 13b are diagrammatic side views showing variations of a fourth preferred embodiment wave rotor apparatus.
Figure 13B:
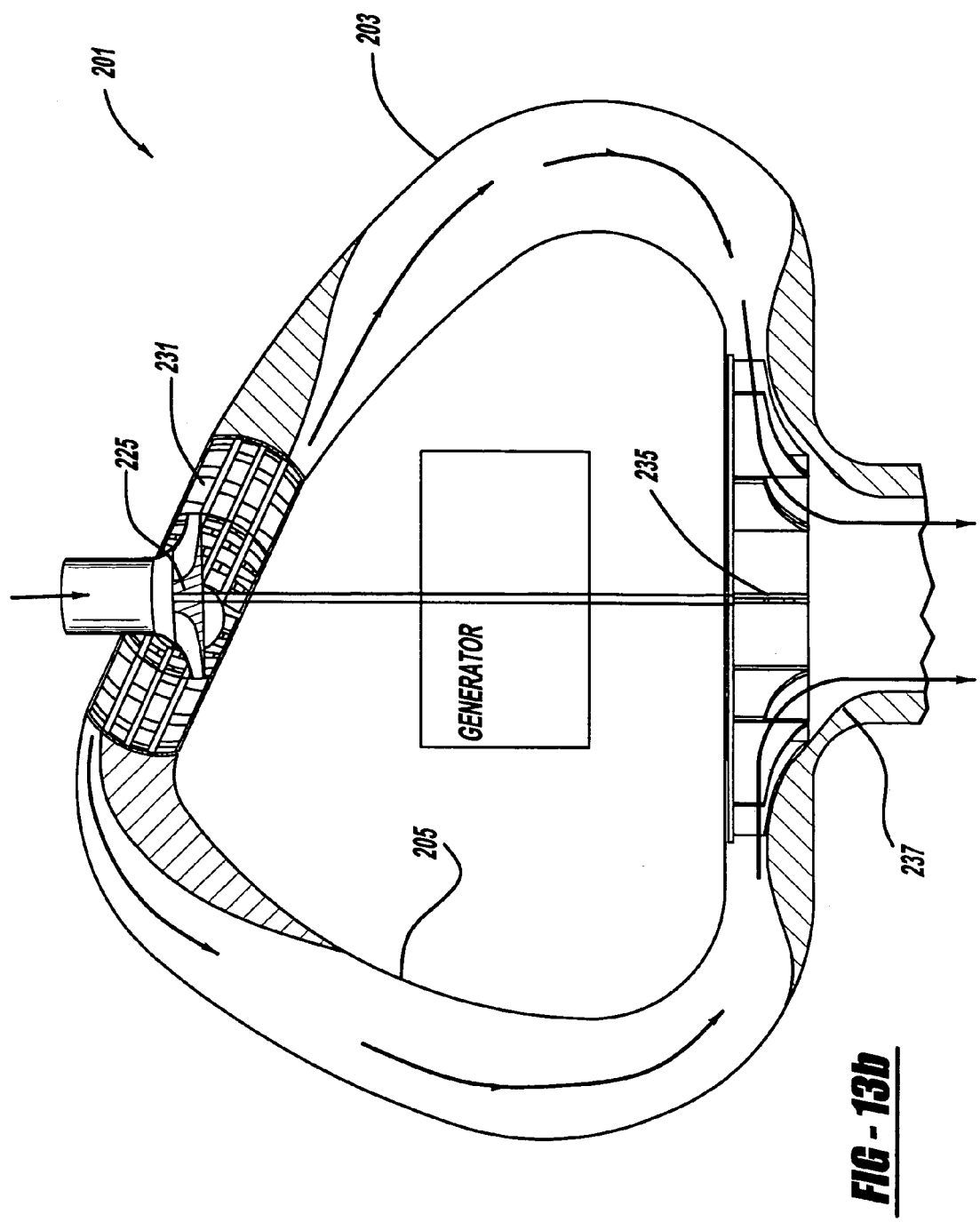

FIG. 13a discloses a first configuration of a fourth preferred embodiment wave rotor apparatus 201 having a radial wave rotor 231, compressor 225, internal and external end plates (not shown) and turbine 235, like that of the first preferred embodiment. Flow collectors 203 and 205 (both showing cut contours of preferably one rotational body that ducts the flow), however, are employed to direct the exiting burned and pre-expanded gas flow from wave rotor 231 and the external end plate port to turbine 235 and a turbine exit port 237. Turbine 235 is mechanically coupled in an indirect manner, through multiple shafts, gears or belts, to compressor 224. FIG. 13b shows another configuration with a direct shaft coupling, where an optional generator is mounted on the shaft.

Another alternate embodiment wave rotor apparatus 251 is illustrated in FIGS. 14a and 14b. In the exemplary embodiment of FIG. 14a, a compressor 253 is mechanically coupled to a turbine 255 by way of a drive shaft 257 or the like. Compressor 253 is located external of radial wave rotor such that flow collector conduits (not shown) are required to flow the fluid from compressor vanes 261 through entry end plate ports, through elongated channels 263 of wave rotor 259, out additional end plate ports and to vanes 265 of turbine 255. Whereas FIG. 14a shows an internal combustion wave rotor configuration, FIG. 14b shows a radial wave rotor configuration with an external combustor. While a through-flow configuration is shown, reverse-flow configurations are possible as well. One or multiple cycles can be realized per revolution with either flow pattern or configuration.

FIGS. 15 and 16 show more details of the internal combustion configurations of FIGS. 1, 2, 4a, 4b, 13a, 13b, 14a and 14b, where the wave rotor apparatus 301 serves as an internal combustion engine employing direct, radial wave rotor flow. Such a configuration can work in conjunction with turbomachinery (see FIGS. 1, 2, 4a, 4b, 13a, 13b, 14a and 14b) or alone, where the exhaust gases may be directed and utilized for jet propulsion and/or work may be extracted by momentum change of the generated radial flow, driving a shaft or generating electricity in a generator. More specifically, a radial wave rotor 303 has multiple layers 305a, 305b, 305c and 305d with each having radially elongated fluid flow passageways or channels 306. Layers 305 and channels 307 are manufactured, stacked and joined much like that explained in the first preferred embodiment, and may have a greater or lesser number of layers and channels than that shown, depending upon the actual usage situation. Each channel has an inlet opening 309, a curved and angularly offset flow path, of varying cross sectional area, and an outlet opening 311. Alternately, straight or other shaped channels can be provided, the cross-sectional area may also be constant and/or the cross-sectional shape may change. Wave rotor 303 operably rotates about a central rotor axis 309 and a stationary base platform 311.

An igniter or spark plug 313 is affixed to platform 311 and is selectively aligned with fire channel apertures 315 in each layer 305 having access to each channel 307. A fuel line 317, having a fuel injector 319 aligned with each layer 305, is stationarily mounted within a central, internal cavity 321 of radial wave rotor 303. An internal end plate 323 has one or more ports aligned with fuel injectors 319. Air inlets 325 allow fresh air from ambient or pre-compressed air from a compressor (such as that of FIG. 9 or 14) through internal end plate ports and into channels 307, when the channels are appropriately aligned with the internal end plate ports. In addition to or instead of the fresh air inlets, a premixed fuel can be alternately employed. In operation, the fuel can be sprayed into the aligned channels 307 from injectors 319, mixing therein with the entering fresh/pre-compressed air, and is then centrifugally compressed in the channels. This mixture is combusted through flame ignition by igniter 313 and fire channel apertures 315, The process of burning fuel significantly increases pressure inside channel 307. Then the burned gases can expand to exit through outlet openings 311 when aligned with ports in an external end plate 331. The exiting gases are then directed to a turbine (such as that of FIG. 3 or 14*a*) or a jet nozzle. It is possible to radially stratify the air and fuel mixture during the channel-filling process. For example, after closing channel 307 from both sides, each fuel and air mixture is trapped in the middle of the channel and ignites, while at the channel ends, a lean mixture of air is present. This keeps the channel ends cool, provides sealing and minimizes undesirable mixture leakage. In other words, the combustion process starts in the central part of the channel, where the fuel and air mixture is rich, and the flame propagates to inner and outer ends of the cell. Since heat release increases pressure inside the channel, opening the outer channel end generates an outflow of the exhaust gases. For curved channels 307, torque is given to the disc or wave rotor 303 during the flow scavenging. This can be used for self-driven rotation or, if large enough, for external work extraction through a shaft or a generator. The outflow of the burned gases can induce an inflow of air and air-fuel mixture into channels 307, refilling and cooling the channels before the cycle starts again. As mentioned before, this cycle also can be self-aspirating without need for external turbomachinery if the combustion is in a pulse detonation mode. This way the internal combustion, radial wave rotor 303 is also considered as an attractive propulsion system and may be used as a simple jet engine even without expensive turbomachinery. Such a jet engine propulsion device would have small and, most importantly, a flat front area.

It is alternately envisioned that fire channel apertures 315 can be either circular holes or elongated slots. Additionally, it is alternately envisioned that fuel injectors can be selectively turned off and on so that only a limited number of the multiple layers of channel sets have fuel injected therein, thereby improving fuel efficiency within the wave rotor portion of the internal combustion engine in certain vehicle operational modes, such as in an idle condition. In another alternate arrangement, rotating electrical igniters, activated only in a certain angular position of the mixture-filled channel or a fixed laser beam igniter, can be substituted for fixed igniter 313 and apertures 315.

Figure 17A:
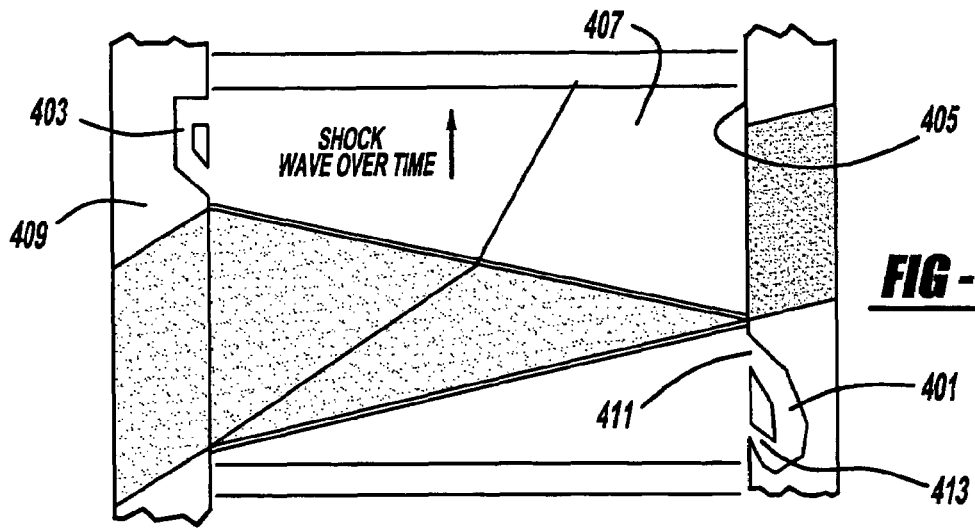
FIGS. 17A-17C are a series of diagrams showing correctional passageways preferably employed in any wave rotor apparatuses.
Figure 17B:
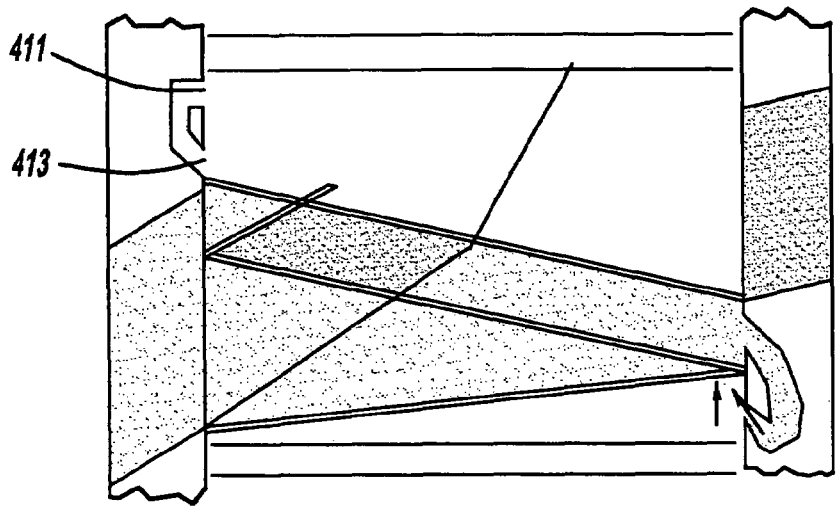
Figure 17C:
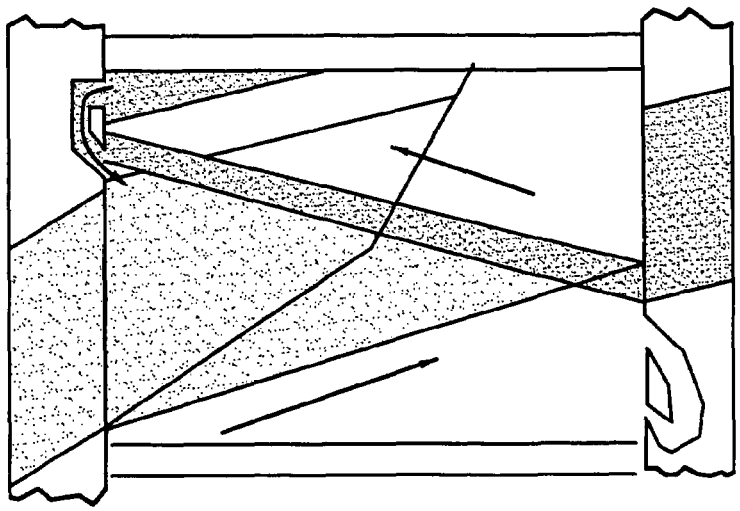

Correctional passages 401 and 403 can be provided in any of the previously disclosed embodiment wave rotor apparatuses or even in any axial wave rotor although some of the advantages of the present invention may not be achieved. This modification is shown in FIGS. 17*a*-17*c*. Correctional passages 401 and 403 are created in side wall surfaces 405 defining each radial channel of a radial wave rotor 409 of any of the preceding embodiments. Alternately, correctional passages 401 and 403 can be employed in even conventional, axial wave rotors although some of the advantages of the present invention may be not realized. Each channel has an inlet opening 411 and an outlet opening 413 with an elongated and generally enclosed intermediate section extending therebetween. The inlet and outlet openings somewhat face the same direction within the channel although the portion of each passage immediately adjacent to inlet 411 may have a different elongated flow angle than the portion of each passage immediately adjacent to outlet opening 413. More specifically, in a preferred construction, outlet opening wall angles preferably have an internal wall angle of about 45 degrees and an external wall angle of about 20 degrees (as measured from surface 405 while the inlet internal wall angle is about 25 degrees and the inlet external wall angle is about 50 degrees, for correctional passage 401. The angles of correctional passage 401 act to accelerate the rotor cell walls as they pass. This is in contrast to correctional passage 403, which serves to break or decelerate the rotor cell walls as they pass the inlet, that has inlet wall angles substantially perpendicular to the adjacent portion of surface 405 while its outlet wall angles are between about 30 and 50 degrees.

The correctional passages correct the rotational speed of disk or rotor to obtain or maintain the proper position of the compression waves. In contrast to the traditional correctional pockets or open, depressions in conventional, axial wave rotors, the correctional passages of the present invention advantageously only have a noticeable effect on fluid flow if the primary and secondary compression waves hitting the end plate are not in their properly desired positions. The arrival location of the primary wave depends on the rotational speed of the wave rotor. In the tuned case, it should be at the leading edge of the compressed air port. A passage having an inlet just before the leading edge of the compressed fluid outlet port, and with an exit or outlet opening in the rotational direction, should have the primary shock wave reach the inlet opening if the rotational speed is too low. The pressure ratio across the shock wave will then induce a jet of redirected fluid to exit the outlet opening of correctional passage 401 and the rotational direction and to thereby accelerate the wave rotor with the momentum of the jet. This is shown in the operational condition of FIG. 17B. FIG. 17C illustrates deceleration caused by correctional passage 403. In the situation of a reverse flow wave rotor, the secondary shock wave arriving at the opposite end plate at the trailing edge of the high pressure inlet port, enters inlet opening 411 and a jet of redirected fluid as projected from outlet opening 413 to slow down or decelerate the wave rotor. The shock wave position for an optimal rotational speed of wave rotor is shown in FIG. 17A.

More specifically, FIG. 17A shows aerodynamic control of the rotational speed of radial wave rotor 409. Its purpose is to adapt the rotational speed to maintain a preferred wave pattern, however, it operates passively without any external control. However, the correcting channels also may be actuated by an active control to better maintain, alter or obtain a desired wave pattern. Special passages 401 and 403 are provided with outlet nozzles directed in and against the rotational direction to accelerate or decelerate wave rotor 409, respectively. These passages can be arranged closely beside the tuned location where a compression wave is supposed to meet the end plate. If the wave pattern becomes off-tune, the location at which the compression wave reaches the end plate moves between the inlet and the outlet of such a passage. This results in a pressure difference between the passage inlet and outlet and generates a jet that can accelerate or decelerate the wave rotor. If the passage, such as 403, is placed in the rotational direction after the location where the shock wave is designed to hit the end plate, its outlet is directed against the rotational direction and the jet will decelerate the rotor, retuning the compression wave to the design location. If the passage, such as 401 is placed before the design arrival location of a compression wave and its outlet is directed in the rotational direction, it serves to retune the wave rotor by accelerating it. For proper passive control, at least one accelerating passage 401 and at least one decelerating passage 403 are needed.

FIG. 17B shows a reverse-flow wave rotor in which the arrival of the primary wave is too early. A passage with an inlet located just before the leading edge of the compressed fluid outlet port and an exit in the rotational direction, will have the primary shock wave hit between both in the case of too low of a rotational speed. The pressure ratio across the shock wave will then induce a jet coming out of passage 401 to exit in the rotational direction and accelerate the wave rotor with its momentum. For deceleration, the same principle is applied in FIG. 17C using a secondary shock wave that should arrive at the opposite end plate at the trailing edge of the high pressure inlet port. The outlet of passage 403 is directed against the rotational direction. This principle is envisioned more for speed control rather than for a primary drive of the radial wave rotor.

Figure 19:
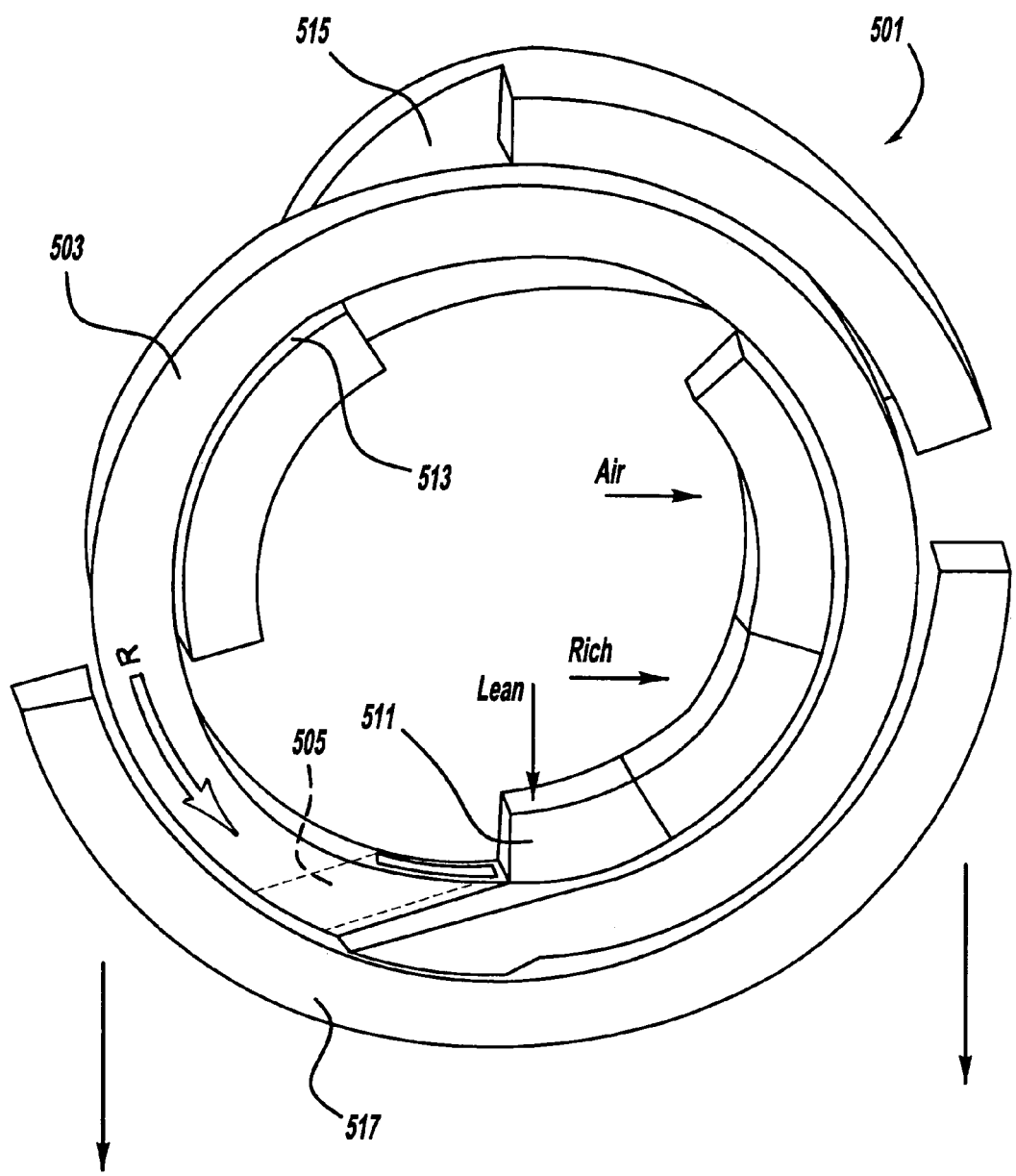
FIG. 19 is a perspective view showing a fourth alternate embodiment wave rotor apparatus.
Figure 20:
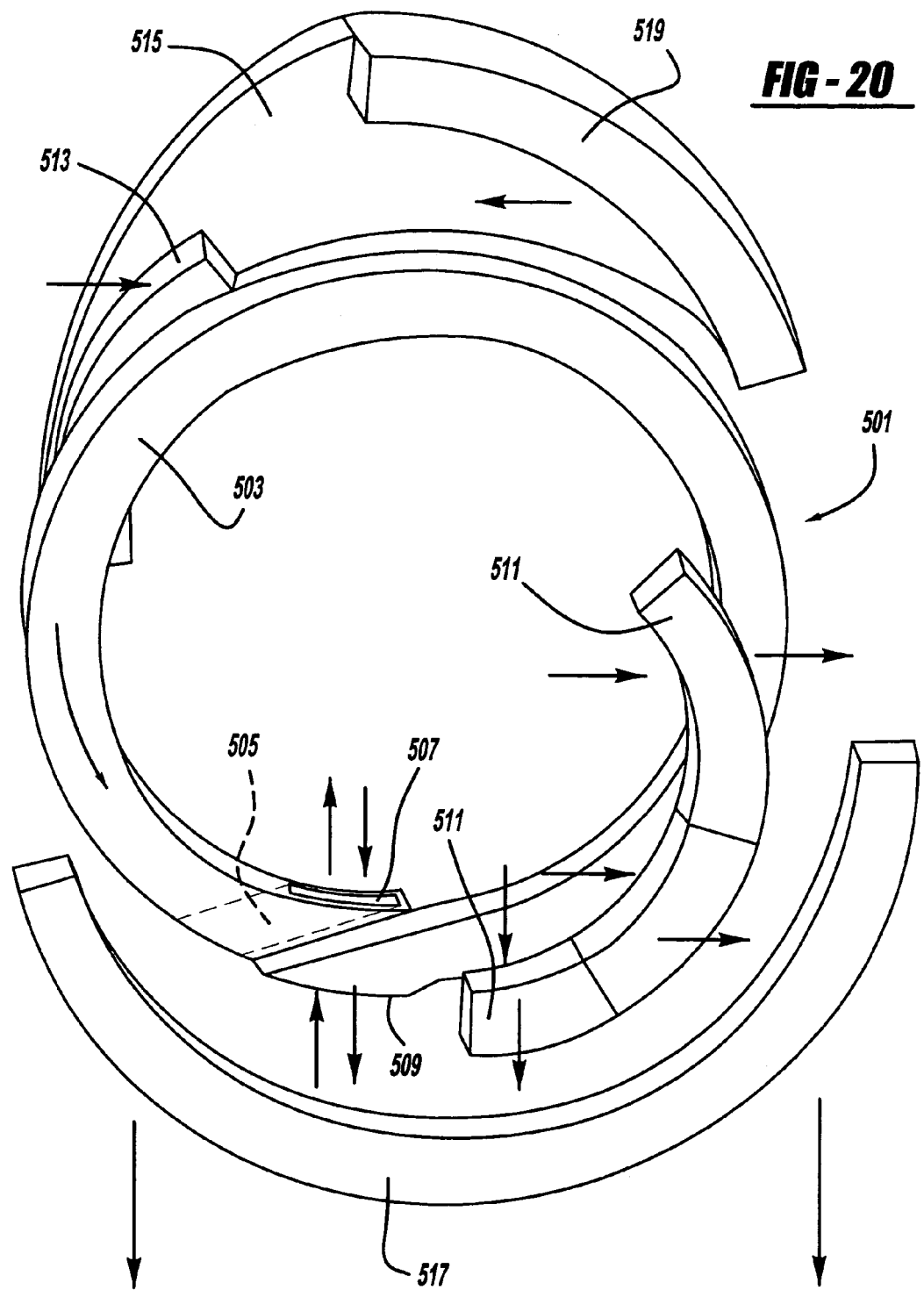
FIG. 20 is an exploded view showing the fourth alternate embodiment wave rotor apparatus.
Figure 21:
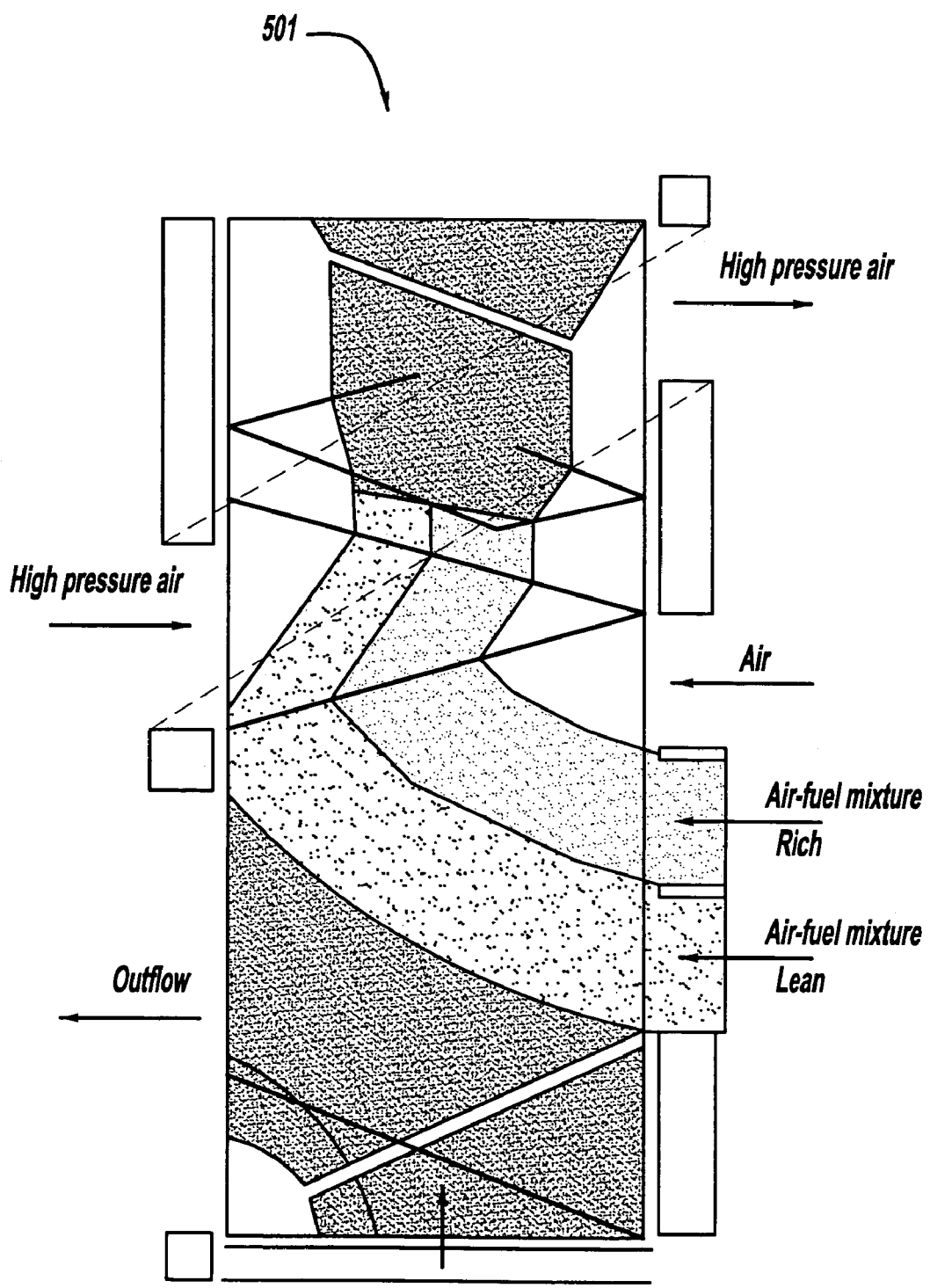
FIG. 21 is a wave diagram showing expected operation of the fourth alternate embodiment wave rotor apparatus of FIGS. 19 and 20.

A fourth alternate embodiment wave rotor apparatus 501 is of a first variation shown in FIGS. 19-21. Apparatus 501 includes a rotating torque ring 503, which acts as a wave rotor disc, rotating in the direction of arrow R, and is the main part of a detonation engine. Wave rotor ring 503 is either directly attached to an output shaft or acts as a rotor in a generator. Ring 503 includes oblique and outwardly radiating (preferably in a changing curved pattern) cuts or fluid channels 505, and two openings, a first opening 507 on an inner side and end, and a second opening 509 on an outer side and end of ring 503. A group of air and air-fuel mixture inlets allow selective access between a stationary port assembly 511 and inside openings of ring 503. An inlet 513 with an internal end plate for a stationary, high pressure passage 515 is selectively in communication with openings in an inner section of ring 503. An outlet port through a stationary end plate 517 receives exhaust gases from ring 503. A portion 519 of the high pressure passage outlet is also located adjacent an outer section of ring 503. Two air-fuel mixture inlets are employed. The first one is for a lean air-fuel mixture and the second one is for a rich air-fuel mixture. The stratified air-fuel layers are precompressed by the compressed air or air-exhaust gas mixture temporarily stored in the high pressure air passage. Ignition of the rich air-fuel mixture is realized near the center part of the cut ring length, such that a shorter time period can be realized, in which the compression wave reaches both ends of the ring. The compressed air, from the ring side where the air inlet is located, is used on the opposite side in order to move the air without internal loops. This embodiment is especially desirable at small sizes, for example with a wave disc outer diameter less than or equal to about ten centimeters, where conventional turbomachinery is inefficient.

Figure 22:
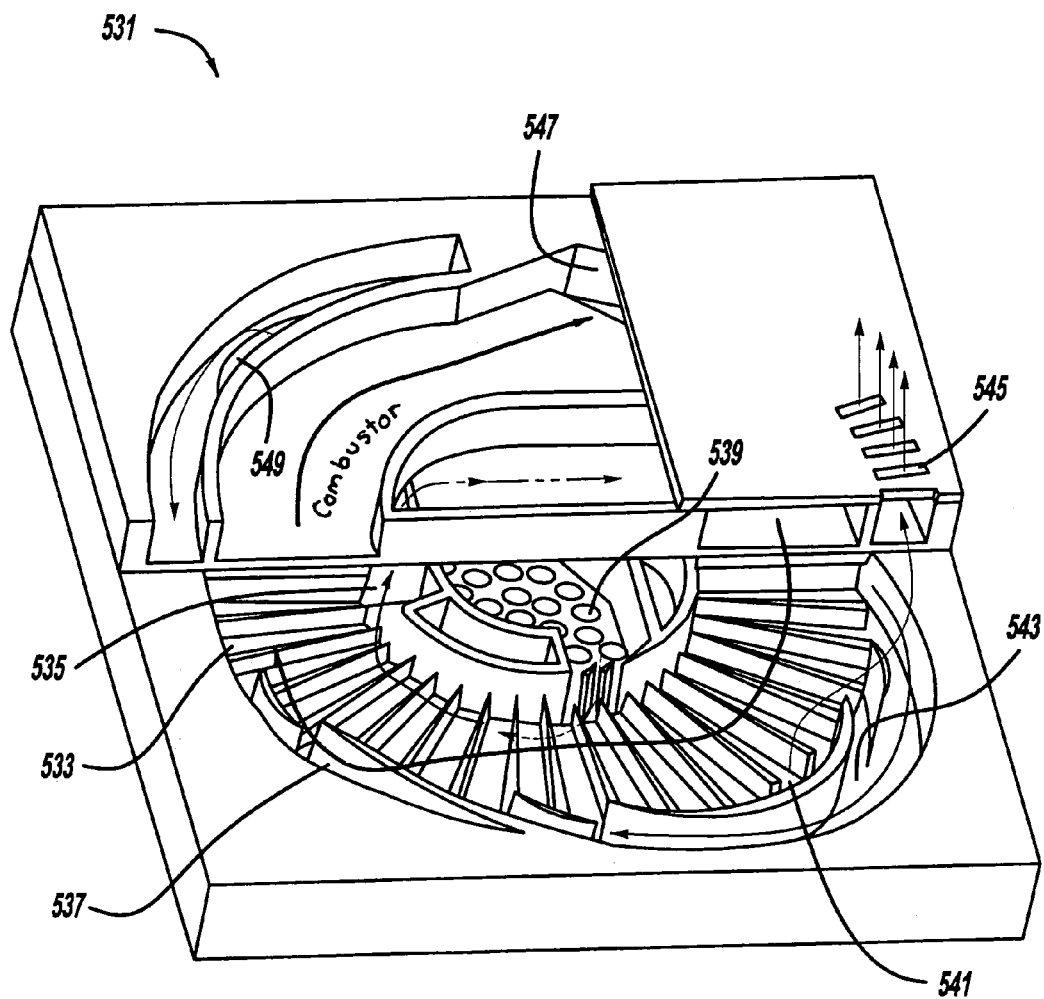
FIG. 22 is a fragmentary, perspective view showing a fifth alternate embodiment wave rotor apparatus, in a two step compression wave engine variation.
Figure 23:
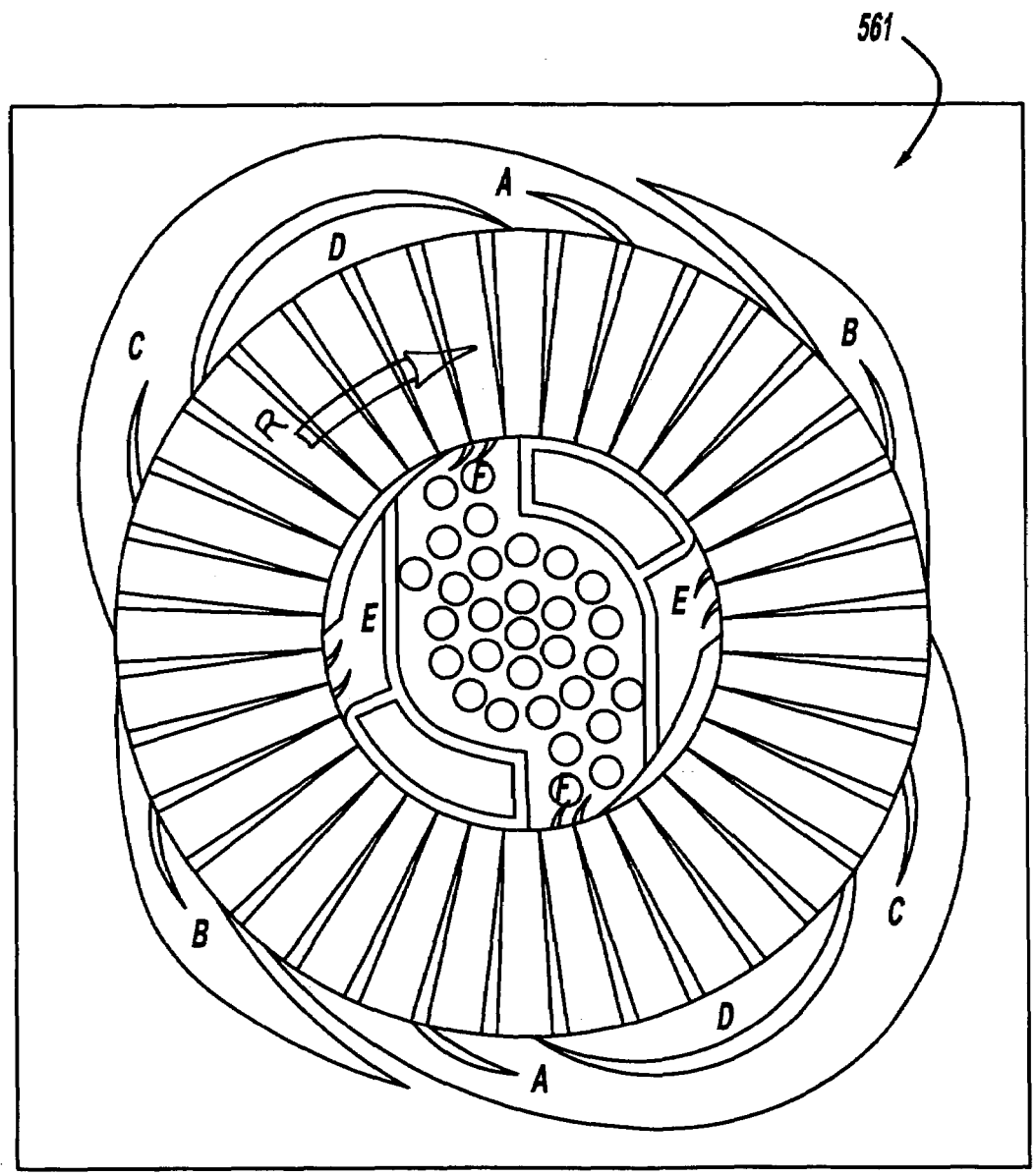
FIG. 23 is a diagrammatic top view showing the fifth alternate embodiment wave rotor apparatus.
Figure 24:
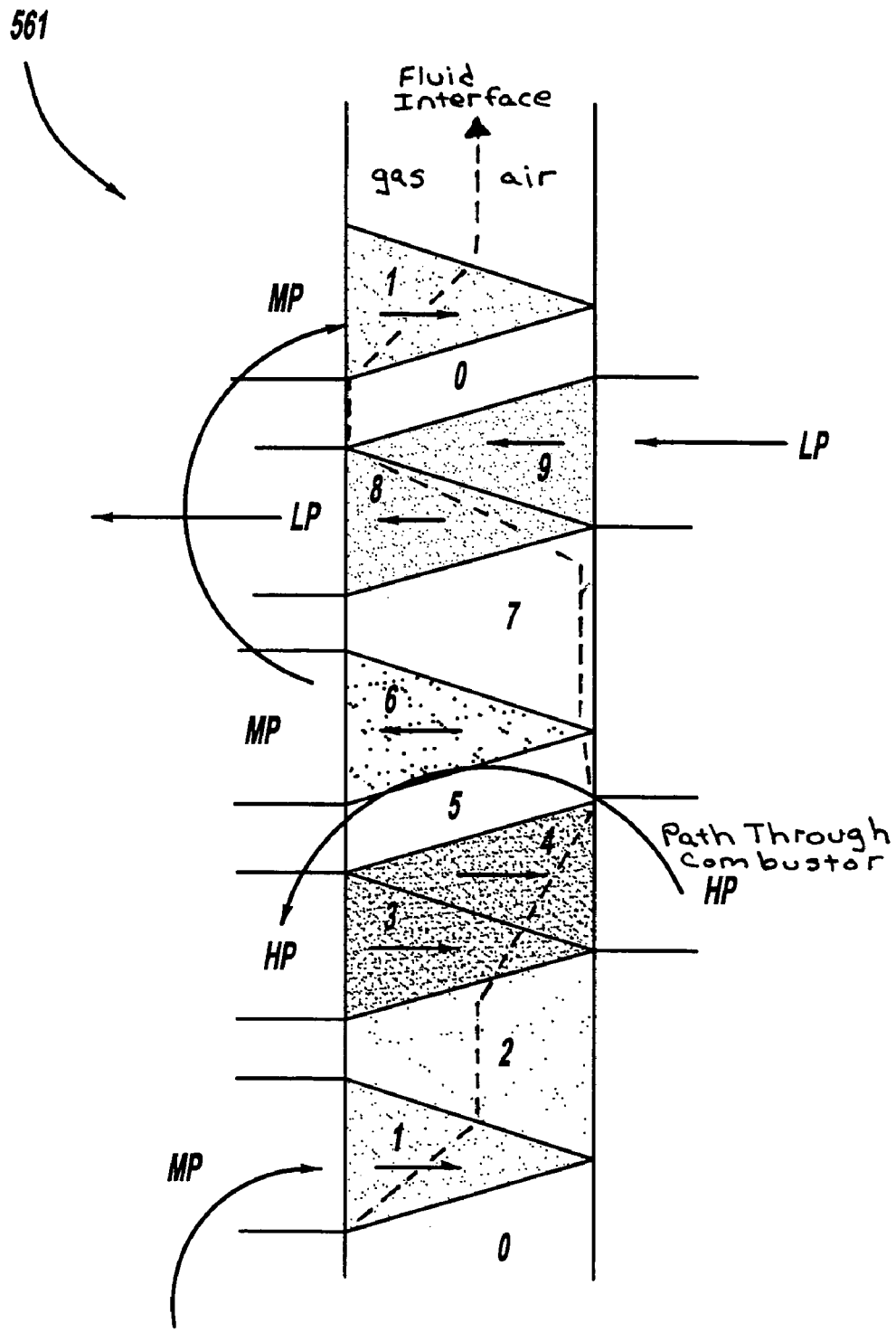
FIG. 24 is a wave diagram showing expected operation of the fifth alternate embodiment wave rotor apparatus of FIGS. 22 and 23.

A fifth alternate embodiment wave rotor apparatus 531/561 is illustrated as a wave disc micro-engine in FIGS. 22-24. A wave disc 533 plays the multifunctional role of an active compression-decompression unit, and an electricity and torque generator. Appropriate port geometry, with oblique blades forming the disc channels, generates torque. Apparatus 531 further includes a compressed air port 535, a high pressure and high temperature port 537, a fresh air inlet 539, a low pressure exhaust gas port 541, a middle pressure passage 543, exhaust gas outlets 545 in a cover, an exhaust gas outlet (in a second layer) from a combustion chamber, and a low pressure exhaust gas port 549. The fresh air arrow in FIG. 22 is shown in dashed lines, the compressed air flow arrows are shown with dot-and-dashed lines and medium thickness solid lines, and the exhaust gas flow arrows are illustrated by thicker solid lines and by thinner solid lines at port 549 and the adjacent channel as well as between port 541 and outlet 545. The first compression step occurs adjacent a center of the wave rotor disc and the second compression step occurs adjacent outer and intermediate portions of the wave rotor disc. The engine disc rotates with speeds much lower than a conventional turbo-unit, thereby simplifying bearing problems and construction of the electric generator. The present wave disc geometrical configuration and porting system causes one and two stage compression-decompression processes to increase the total efficiency. Middle pressure by-pass generates the torque and consequently, net power. Wave disc 533 is a radial wave rotor having curved channels. It overcomes the traditional poor scavenging problem by adding, in a controllable way, additional force (being the component of centrifugal forces) which improves the scavenging process. Further, the motor-generator can be directly integrated within the engine.

The exemplary construction of FIG. 22 is a two step compression-decompression micro-engine manufactured by MEMS technology. A double port set with two parallel operating combustion chambers is used. The engine case can be prepared as a three part set with the most complicated part containing a basic plate with all port arrangements. The second part forms combustion chambers and outflow mufflers and the third part defines the cover with air inlets and exhaust gas outlets. The wave rotor disc is formed as two parts etched together. Moreover, an electric motor-generator is imprinted in the case part containing ports and in one of parts forming a wave disc.

As can be observed in FIGS. 23 and 24, micro-engine apparatus 561 includes a high pressure gas port (port B), two middle pressure gas ports (inlet (port A) and an outlet (port C)), connected by a passage, and a low pressure gas outflow port (port D), are all located in the radial wave rotor disc. A high pressure air port (port E) and a low pressure fresh air port (port F) are located at the inner side of the wave disc. Generally this flow arrangement can be classified as the reversed flow configuration. Centrifugal forces are believed to improve the flow during the scavenging and to slightly disturb the compression process. Enough energy exists during the compression process to overcome the negative influence of centrifugal forces. During the end of traditional scavenging processes, there exists a lack of energy to completely remove exhaust gases from cells. In contrast, centrifugal forces of the present invention act to improve the scavenging process. Predicted two-step compression micro-engine efficiency is 13-16% in the stable operational area. In the case of a single compression step wave engine, estimated efficiency is about 6%. In the simplified wave diagram of FIG. 24, fresh air is indicated at area 2, compressed air is indicated at areas 1, 6, 8 and 9, and exhaust gases are indicated at areas 3 and 4. The compression and expansion flow parameters in the areas on the wave diagram, separated by waves, are constant.

Various embodiments have been disclosed, however, variations can be made which fall within the scope of the present invention. For example, the wave rotor can be stationary with the end plates rotating, although centrifugal flow advantages may not be fully realized. Further, it is envisioned that an electric motor actuator or the like may drive the wave rotor. Reverse-flow or through-flow wave rotor channels can be employed. Various aspects of the ultra-micro devices and methods disclosed in PCT Serial No. PCT/US05/24290, filed on Jul. 7, 2005, entitled "Ultra Micro Gas Turbine" and invented by Muller et al., which is incorporated by reference herein, can be used with the radial wave rotor of the present invention. Additionally, it is envisioned that the present invention pertains to the internal location of compressors or other rotatable members within an internal cavity of otherwise conventional axial wave rotors, although many of the advantages of the radial wave rotor may not be achieved. It is further envisioned that two or more radial wave rotors can be coaxially aligned and used together, preferably rotating at the same speed, or alternately, at different speeds. While various materials, quantities and shapes have been disclosed, it should be appreciated that various other materials, quantities and shapes can be employed. It is intended by the following claims to cover these and any other departures from the disclosed embodiments which fall within the true spirit of this invention.

The invention claimed is:

1. An apparatus comprising: a wave rotor operably rotating about a rotor axis; the wave rotor including a first set of channels located substantially on a first plane, a second set of channels located substantially on a second plane and at least a third set of channels located substantially on at least a third plane, the first, second, and third sets of channels each being in a stacked relationship offset along the rotor axis; and at least the majority of the channels having elongated flow directions outwardly radiating relative to the rotor axis.

2. The apparatus of claim 1 further comprising multiple channels located substantially on a fourth plane, the planes being substantially parallel to each other, openings of the channels on the first plane being circumferentially offset from those on the second plane.

3. The apparatus of claim 1 wherein at least a majority of the channels are radially offset from the rotor axis, and the first, second and third planes are substantially parallel.

4. The apparatus of claim 1 wherein all of the channels are substantially perpendicular to the rotor axis.

5. The apparatus of claim 1 wherein at least a majority of the channels have a straight elongated orientation.

6. The apparatus of claim 1 wherein at least a majority of the channels have a curved elongated orientation.

7. The apparatus of claim 1 wherein the channels on the first plane are made as a separate layer from the channels on the second plane, the layers being stacked upon each other and joined together in a coaxial manner.

8. The apparatus of claim 1 further comprising a fuel injector and igniter aligned with at least one of the channels in at least one operating position, wherein the wave rotor utilizes shock waves to exchange energy from a high energy fluid to a low energy fluid, increasing both temperature and pressure of the low energy fluid, in an internal combustion engine.

9. An apparatus comprising:
a wave rotor having a plurality of fluid passageways, the wave rotor being rotatable about a rotor axis, the wave rotor having an internal surface defining an internal cavity; and
a rotatable member located inside the internal cavity of the wave rotor, the member further comprising a plurality of fluid-impinging vanes rotatable about a member axis independent of the fluid passageways.

10. The apparatus of claim 9 wherein the member is a fluid compressor.

11. The apparatus of claim 9 wherein the member axis is angularly offset from the rotor axis.

12. The apparatus of claim 9 wherein the member axis is offset from the rotor axis by about 20-50 degrees, the vanes of the member being oriented in an outwardly radiating manner relative to the member axis.

13. The apparatus of claim 9 wherein the wave rotor is a radial wave rotor with its passageways being elongated in an orientation substantially radially offset relative to the rotor axis.

14. The apparatus of claim 9 further comprising:
an internal end plate having at least one port, the internal end plate being located between the internal surface of the wave rotor and the member; and
an external end plate having at least one port, the external end plate being located around an exterior surface of the wave rotor substantially coaxial with the rotor axis;
the ports of the internal and external end plates selectively aligning with the wave rotor passageways depending upon the positioning of the wave rotor; and
other portions of the internal and external end plates selectively blocking fluid entry and exit of the wave rotor passageways depending upon the positions of the wave rotor.

15. The apparatus of claim 9 further comprising:
a rotatable turbine mechanically coupled to the member; and
a turbine volute surrounding at least a portion of the turbine;
wherein fluid first flows to the member, radially outward through the wave rotor passages, through the turbine volute and subsequently to the turbine.

16. The apparatus of claim 9 further comprising a fuel injector and igniter aligned with at least one of the passageways in at least one operating position, wherein the wave rotor utilizes shock waves to exchange energy from a high energy fluid to a low energy fluid, increasing both temperature and pressure of the low energy fluid, in an internal combustion engine.

17. An apparatus comprising:
a radial wave rotor including a rotational axis and multiple fluid carrying channels angularly offset from the axis in a substantially radial manner;
a radial compressor selectively in fluid communication with and being located inside the radial wave rotor; and
a turbine;
the compressor and radial wave rotor operably utilizing fluid to exchange energy from a high energy fluid state to a low energy fluid state, increasing both temperature and pressure of the low energy fluid state during fluid flow from the compressor to the radial wave rotor and then to the turbine, free of a collector and free of a diffuser.

18. The apparatus of claim 17 further comprising a mechanical coupling attaching the turbine to the radial compressor.

19. The apparatus of claim 18 further comprising a turbine volute surrounding at least a majority of the turbine.

20. The apparatus of claim 17 wherein the radial wave rotor includes some of the channels being located on a first plane which are a separate layer from some of the channels being located on a second plane, the layers being stacked upon each other in a coaxial manner.

21. An apparatus comprising a radial wave rotor including a rotational rotor axis and fluid carrying channels having fluid flow directions oriented substantially radial to the rotor axis, the radial wave rotor operably creating a compressed fluid-pressure wave, and a plurality of groups of channels adjacent each other being in a stacked relationship, the groups of channels being offset from each other along the rotor axis.

22. The apparatus of claim 21 further comprising a compressor located internal to the radial wave rotor, the compressor operably rotating around a compressor axis.

23. The apparatus of claim 22 wherein the compressor axis is angularly offset from the rotor axis.

24. The apparatus of claim 21 wherein at least a majority of the channels have a straight elongated orientation.

25. The apparatus of claim 21 wherein at least a majority of the channels have a curved elongated orientation.

26. The apparatus of claim 21 wherein an opening of each of the channels has a substantially square shape relative to the rotor axis.

27. The apparatus of claim 21 wherein an opening of each of the channels has a substantially diamond shape relative to the rotor axis.

28. The apparatus of claim 21 further comprising a fuel injector and igniter aligned with at least one of the channels in at least one operating position, wherein the wave rotor utilizes shock waves to exchange energy from a high energy fluid to a low energy fluid, increasing both temperature and pressure of the low energy fluid, in an internal combustion engine.

29. The apparatus of claim 21 further comprising:
a compressor;
an internal end plate having at least one port, the internal end plate being located between an internal surface of the wave rotor and the compressor; and
an external end plate having at least one port, the external end plate being located around an exterior surface of the wave rotor substantially coaxial with the rotor axis;
the ports of the internal and external end plates selectively aligning with the wave rotor channels depending upon the positioning of the wave rotor.

30. The apparatus of claim 21 wherein fluid flows into the wave rotor at a subsonic speed.

31. The apparatus of claim 21 wherein the wave rotor acts as a refrigeration condenser.

32. The apparatus of claim 21 wherein the wave rotor is part of an aircraft jet engine.

33. The apparatus of claim 21 further comprising an active compression-decompression wave engine using centrifugal forces acting on fluid in the wave rotor to improve scavenging therein, the wave rotor generating torque during operation.

34. An apparatus comprising:
a wave rotor having fluid flow paths, the wave rotor being rotatable about a rotor axis; and
a compressor including fluid-contacting structures rotatable about a compressor axis;
the compressor axis being angularly offset from the rotor axis, and the compressor operably supplying fluid to the wave rotor.

35. The apparatus of claim 34 wherein the wave rotor is a radial wave rotor with its paths being elongated in an orientation substantially radially offset relative to the rotor axis.

36. The apparatus of claim 34 wherein the compressor axis is offset from the rotor axis by about 20-50 degrees.

37. The apparatus of claim 34 further comprising:
an internal end plate having at least one port, the internal end plate being located between an internal surface of the wave rotor, defining an internal cavity, and the compressor; and
an external end plate having at least one port, the external end plate being located around an exterior surface of the wave rotor substantially coaxial with the rotor axis;
the ports of the internal and external end plates selectively aligning with the wave rotor paths depending upon the positioning of the wave rotor.

38. The apparatus of claim 34 wherein the compressor is rotatably located inside an internal cavity of the wave rotor.

39. A wave rotor apparatus comprising a surface defining an elongated channel being rotated around an axis, a shock wave of a flowing fluid moving through the channel, and a correctional passage located in the surface, the correctional passage being elongated and enclosed between an inlet and an outlet of the passage, the correctional passage operably receiving a portion of the flowing fluid and changing flow characteristics of the shock wave in at least one operating condition;
wherein the channel is part of a radial wave rotor, the channel being radially elongated in a direction offset from the axis.

40. The apparatus of claim 39 wherein the inlet and outlet of the correctional passage substantially face the same direction, and the correctional passage operably varies a rotational speed of the wave rotor to obtain a proper position of the shock wave.

41. An apparatus comprising:
a wave rotor including multiple fluid-carrying passageways, each of the passageways having an inlet opening and an outlet opening; and
at least one end plate including a fluid blocking section, and the end plate further including an elongated and diagonally angled peripheral opening face of the port being in periodic alignment with at least one of the passageways to allow fluid flow between the port and aligned passageway, the opening face being adjacent the wave rotor, the port being elongated and diagonally angled across a peripheral surface of the end plate, and the elongation direction of the port being angularly offset from a rotational axis of the wave rotor.

42. An apparatus comprising:
a wave rotor including multiple fluid-carrying passageways, each of the passageways having an inlet opening and an outlet opening; and
at least one end plate including a fluid blocking section, and the end plate further including a port defined by an edge at an internal face of the end plate, the edge of the port being elongated and diagonally angled port, the port being in periodic alignment with at least one of the passageways to allow fluid flow between the port and aligned passageway;
wherein the passageways of the wave rotor are elongated in an outwardly radiating direction relative to a rotational axis of the wave rotor.

43. The apparatus of claim 41 wherein fluid flows into the wave rotor at a subsonic speed and the passageways have a curve in their elongated directions.

44. An apparatus comprising:
a radial wave rotor having a plurality of fluid passageways, the wave rotor being rotatable about a rotor axis with the passageways being elongated in an orientation substantially radially offset relative to the rotor axis, the wave rotor having an internal surface defining an internal cavity; and
an electromagnetic generator located inside the cavity of the wave rotor.

45. The apparatus of claim 44 wherein the device is an electric motor.

46. An apparatus comprising:
a wave rotor having a plurality of fluid passageways, the wave rotor being rotatable about a rotor axis, the wave rotor having an internal surface defining an internal cavity; and
an electromagnetic device located inside the cavity of the wave rotor;
wherein a central axis of the device is angularly offset from the rotor axis.

47. The apparatus of claim 46 wherein the wave rotor is a radial wave rotor with its passageways being elongated in an orientation substantially radially offset relative to the rotor axis.

48. The apparatus of claim 44 wherein the device is an electric generator.

49. The apparatus of claim 1 wherein certain sets of the channels operate in a different timing scheme.

50. The apparatus of claim 21 further comprising an active compression-decompression wave engine using centrifugal forces acting on fluid in the wave rotor to improve compression therein, the wave rotor generating torque during operation.

51. The apparatus of claim 21 further comprising an active compression-decompression wave engine using the radial channel orientation in the wave rotor to improve scavenging therein, the wave rotor generating torque during operation.

52. A method of manufacturing a power generation assembly comprising:
(a) creating a first member to include outwardly radiating fluid passageways and an internal cavity;
(b) creating a second member to include fluid-contacting vanes;
(c) orienting the second member substantially inside the cavity of the first member;
(d) providing selective fluid communication between the first and second members;
(e) allowing the first and second members to rotate independently of each other in at least one condition; and
(f) utilizing shock waves inside the passageways of the first member to transfer energy from a high energy fluid to a low energy fluid, increasing both temperature and pressure of the low energy fluid.

53. The method of claim 52 wherein the first member is a radial wave rotor and the second member is a compressor.

54. The method of claim 52 wherein the first member is a radial wave rotor with internal combustion.

55. The method of claim 52 further comprising aligning an internal combustion engine fuel injector and an igniter with at least one of the passageways.

56. The method of claim 52 further comprising connecting a rotatable turbine to the second member and flowing fluid to the members and thereafter to the turbine.

57. The method of claim 52 further comprising making the first member with stacked layers, with at least some of the layers each including an outwardly radiating set of the passageways, such that the outwardly radiating passageways are located on different parallel planes substantially perpendicular to a rotational axis of the first member.

58. The apparatus of claim 41 further comprising a fuel injector and igniter aligned with at least one of the passageways in at least one operating position, wherein the wave rotor utilizes shock waves to exchange energy from a high energy fluid to a low energy fluid, increasing both temperature and pressure of the low energy fluid, in an internal combustion engine.

59. The apparatus of claim 41 wherein at least a majority of the passageways have a straight elongated orientation.

60. The apparatus of claim 41 further comprising an external end plate having a port which is elongated and diagonally angled across an internal surface of the end plate, the wave rotor operably rotating between the end plates.

61. The apparatus of claim 41 further comprising:
a fluid compressor;
a rotatable turbine mechanically coupled to the compressor; and
a turbine volute surrounding at least a portion of the turbine;
wherein fluid first flows to the compressor, radially outward through the wave rotor passages, through the turbine volute and subsequently to the turbine.

62. The apparatus of claim 42 further comprising a fuel injector and igniter aligned with at least one of the passageways in at least one operating position, wherein the wave rotor utilizes shock waves to exchange energy from a high energy fluid to a low energy fluid, increasing both temperature and pressure of the low energy fluid, in an internal combustion engine.

63. The apparatus of claim 42 wherein at least a majority of the passageways have a straight elongated orientation.

64. The apparatus of claim 42 further comprising an external end plate having a port which is elongated and diagonally angled across an internal surface of the end plate, the wave rotor operably rotating between the end plates.

65. The apparatus of claim 42 further comprising:
a fluid compressor;
a rotatable turbine mechanically coupled to the compressor; and
a turbine volute surrounding at least a portion of the turbine;
wherein fluid first flows to the compressor, radially outward through the wave rotor passages, through the turbine volute and subsequently to the turbine.

* * * * *

UNITED STATES PATENT AND TRADEMARK OFFICE
CERTIFICATE OF CORRECTION

| | | |
|---|---|---|
| PATENT NO. | : 7,555,891 B2 | |
| APPLICATION NO. | : 11/271483 | |
| DATED | : July 7, 2009 | |
| INVENTOR(S) | : Norbert Müller et al. | |

It is certified that error appears in the above-identified patent and that said Letters Patent is hereby corrected as shown below:

On the Title Page, No. Item (56), References Cited, Other Publications, page 2, Other Publication No. 5, "N. Mëller" should be --N. Müller--.

Column 16, line 10, Claim 41, after "angled", delete "peripheral opening face of the".

Column 16, line 13, Claim 41, after "passageway,", delete "the opening face being adjacent the wave rotor,".

Column 16, line 15, Claim 41, after "end plate,", delete "and".

Signed and Sealed this
Eighteenth Day of October, 2011

David J. Kappos
*Director of the United States Patent and Trademark Office*